(12) United States Patent
Uchida

(10) Patent No.: US 12,164,683 B2
(45) Date of Patent: Dec. 10, 2024

(54) ELECTRONIC DEVICE AND CONTROL METHOD THEREFOR

(71) Applicant: CANON KABUSHIKI KAISHA, Tokyo (JP)

(72) Inventor: Takeshi Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/303,723

(22) Filed: Apr. 20, 2023

(65) Prior Publication Data

US 2023/0266821 A1    Aug. 24, 2023

Related U.S. Application Data

(63) Continuation of application No. PCT/JP2021/035312, filed on Sep. 27, 2021.

(30) Foreign Application Priority Data

Oct. 30, 2020   (JP) .................................. 2020-182702

(51) Int. Cl.
*G06F 3/01* (2006.01)
*G02B 7/28* (2021.01)
(Continued)

(52) U.S. Cl.
CPC ................ *G06F 3/013* (2013.01); *G02B 7/28* (2013.01); *G02B 7/287* (2013.01);
(Continued)

(58) Field of Classification Search
CPC ......... G06F 3/013; G06F 3/0346; G02B 7/28; G02B 7/287; G02B 27/0093; G03B 15/00;
(Continued)

(56) References Cited

U.S. PATENT DOCUMENTS

| 2015/0199005 A1* | 7/2015 | Haddon | ............. G06F 3/013 345/163 |
| 2019/0147618 A1* | 5/2019 | Sugimoto | ............. G06V 40/193 348/222.1 |

FOREIGN PATENT DOCUMENTS

| JP | 04-335605 A | 11/1992 |
| JP | 05-210040 A | 8/1993 |

(Continued)

OTHER PUBLICATIONS

International Search Report dated Dec. 7, 2021 of International Application No. PCT/JP2021/032312, which is enclosed.

(Continued)

*Primary Examiner* — Douglas M Wilson
(74) *Attorney, Agent, or Firm* — Cowan, Liebowitz & Latman, P.C.

(57) ABSTRACT

An electronic device that has a line-of-sight detection function and is capable of suppressing the execution of an operation different from the intention of a user, and a control method therefor are disclosed. The device has a function for detecting coordinates on an image at which a user is gazing as point-of-gaze coordinates. The device, in a case where a movement of the point-of-gaze coordinates has been detected, measures a duration of the point-of-gaze coordinates after the movement. The device further determines that the movement of the point-of-gaze coordinates with the duration larger than a time threshold is a viewpoint movement that is intended by the user, and determines that the movement of the point-of-gaze coordinates with the duration equal to or smaller than the time threshold is a viewpoint movement that is not intended by the user.

10 Claims, 15 Drawing Sheets

(51) Int. Cl.
  *G02B 27/00* (2006.01)
  *G03B 13/36* (2021.01)
  *G03B 15/00* (2021.01)
  *G06F 3/0346* (2013.01)
  *G06T 7/20* (2017.01)
  *G06T 7/70* (2017.01)
  *H04N 23/60* (2023.01)
  *H04N 23/67* (2023.01)
  *G03B 17/02* (2021.01)

(52) U.S. Cl.
  CPC .......... *G02B 27/0093* (2013.01); *G03B 13/36* (2013.01); *G03B 15/00* (2013.01); *G03B 17/02* (2013.01); *G03B 2213/025* (2013.01); *G06F 3/0346* (2013.01); *G06T 7/20* (2013.01); *G06T 7/70* (2017.01); *H04N 23/60* (2023.01); *H04N 23/675* (2023.01)

(58) Field of Classification Search
  CPC .. G03B 17/02; G03B 13/36; G03B 2213/025; H04N 23/60; H04N 23/675; G06T 7/70; G06T 7/20
  See application file for complete search history.

(56) References Cited

FOREIGN PATENT DOCUMENTS

| | | |
|---|---|---|
| JP | 07-240868 A | 9/1995 |
| JP | 2004-008323 A | 1/2004 |

OTHER PUBLICATIONS

Apr. 1, 2024 Japanese Office Action, which is enclosed without an English Translation, that issued in Japanese Patent Application No. 2020-182702.

* cited by examiner

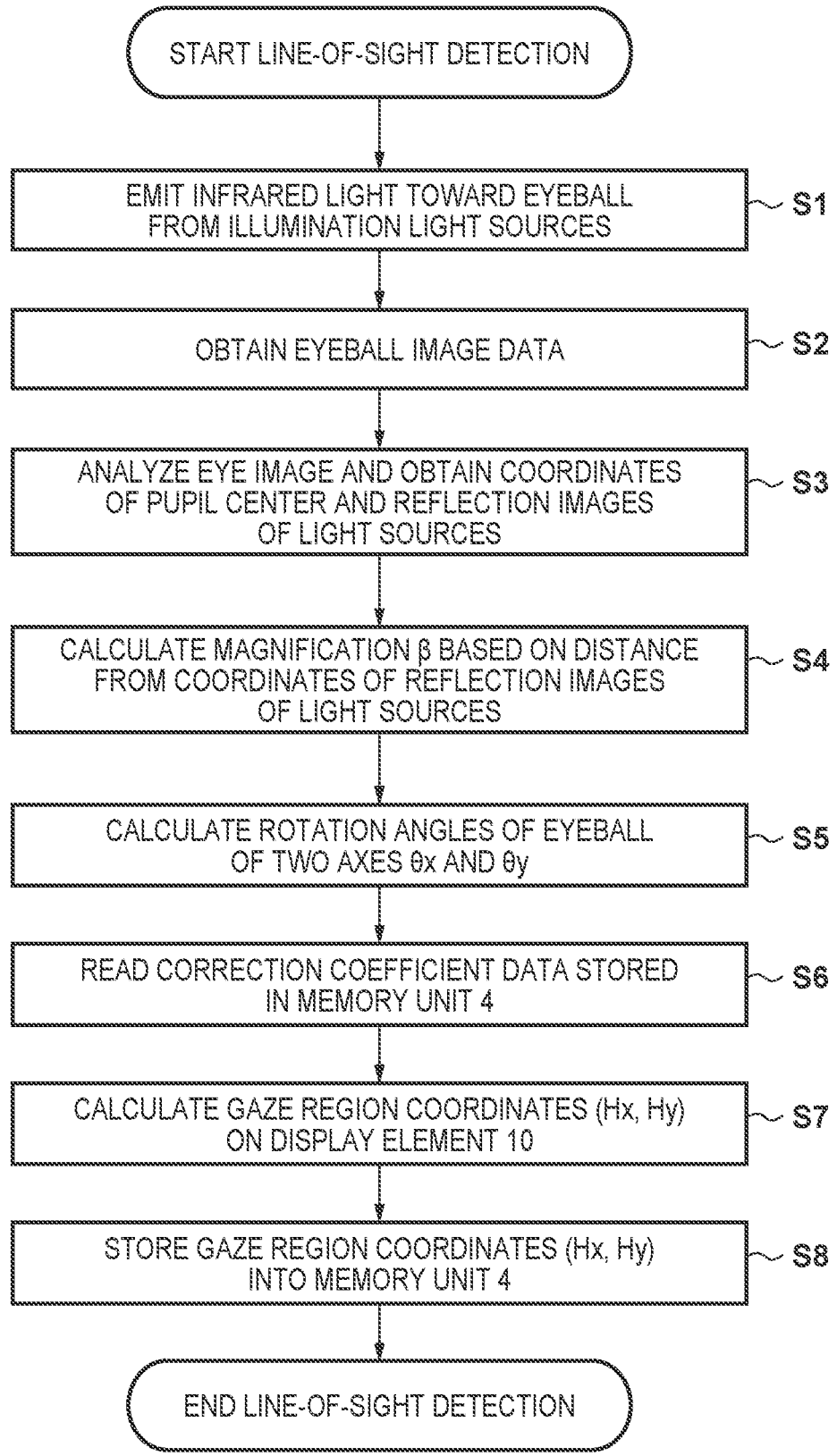

MOVE CAMERA SO THAT MOVING SUBJECT IS POSITIONED NEAR CENTER OF IMAGE CAPTURING AREA

ELECTRONIC DEVICE AND CONTROL METHOD THEREFOR

CROSS-REFERENCE TO RELATED APPLICATIONS

This application is a Continuation of International Patent Application No. PCT/JP2021/035312, filed Sep. 27, 2021, which claims the benefit of Japanese Patent Application No. 2020-182702, filed Oct. 30, 2020, both of which are hereby incorporated by reference herein in their entirety.

BACKGROUND OF THE INVENTION

Field of the Invention

The present invention relates to an electronic device and a control method therefor, and especially to an electronic device with a line-of-sight detection function and a control method therefor.

Background Art

There are known cameras that have a line-of-sight detection function and are capable of selecting a focus detection region by way of line-of-sight input.

CITATION LIST

Patent Literature

PTL 1 Japanese Patent Laid-Open No. 2004-008323

However, it is difficult to constantly keep looking at only a specific subject while visually confirming a field image, and there are times when the line of sight shifts to another subject. This can cause a camera to perform an operation of focusing on a subject that is different from the intention of a user.

SUMMARY OF THE INVENTION

The present invention, in one aspect thereof, provides an electronic device that has a line-of-sight detection function and is capable of suppressing the execution of an operation different from the intention of a user, and a control method therefor.

According to an aspect of the present invention, there is provided an electronic device, comprising: one or more processors that execute a program stored in a memory and thereby function as: a detection unit configured to detect coordinates on an image at which a user is gazing as point-of-gaze coordinates; a measurement unit configured to, in a case where a movement of the point-of-gaze coordinates has been detected, measure a duration of the point-of-gaze coordinates after the movement; and a determination unit configured to determine that the movement of the point-of-gaze coordinates with the duration larger than a time threshold is a viewpoint movement that is intended by the user, and determine that the movement of the point-of-gaze coordinates with the duration equal to or smaller than the time threshold is a viewpoint movement that is not intended by the user, wherein the measurement unit measures the duration with regard to a movement of the point-of-gaze coordinates with an amount of movement that exceeds a distance threshold, and wherein the amount of movement is based on a plurality of amounts of movement including past amounts of movement.

According to another aspect of the present invention, there is provided an image capturing apparatus, comprising: one or more processors that execute a program stored in a memory and thereby function as: a detection unit configured to detect coordinates on a live-view image at which a user is gazing as point-of-gaze coordinates; a measurement unit configured to, in a case where a movement of the point-of-gaze coordinates has been detected, measure a duration of the point-of-gaze coordinates after the movement; and a determination unit configured to upon detection of the movement of the point-of-gaze coordinates with the duration larger than a time threshold, use a feature region that includes the point-of-gaze coordinates after the movement as a new main subject region, and upon detection of the movement of the point-of-gaze coordinates with the duration equal to or smaller than the time threshold, maintain a main subject region before the movement of the point-of-gaze coordinates, wherein the measurement unit measures the duration with regard to a movement of the point-of-gaze coordinates with an amount of movement that exceeds a distance threshold, and wherein the amount of movement is based on a plurality of amounts of movement including past amounts of movement.

According to a further aspect of the present invention, there is provided a control method for an electronic device executed by the electronic device, comprising: detecting coordinates on an image at which a user is gazing as point-of-gaze coordinates; in a case where a movement of the point-of-gaze coordinates has been detected, measuring a duration of the point-of-gaze coordinates after the movement; and determining that the movement of the point-of-gaze coordinates with the duration larger than a time threshold is a viewpoint movement that is intended by the user; and determining that the movement of the point-of-gaze coordinates with the duration equal to or smaller than the time threshold is a viewpoint movement that is not intended by the user, wherein the measuring measures the duration with regard to a movement of the point-of-gaze coordinates with an amount of movement that exceeds a distance threshold, and wherein the amount of movement is based on a plurality of amounts of movement including past amounts of movement.

According to another aspect of the present invention, there is provided a non-transitory computer-readable medium storing a program that causes, when executed by a computer included in an electronic device that has a function of detecting coordinates on an image at which a user is gazing as point-of-gaze coordinates, the computer to function as: a detection unit configured to detect coordinates on an image at which a user is gazing as point-of-gaze coordinates; a measurement unit configured to, in a case where a movement of the point-of-gaze coordinates has been detected, measure a duration of the point-of-gaze coordinates after the movement; and a determination unit configured to determine that the movement of the point-of-gaze coordinates with the duration larger than a time threshold is a viewpoint movement that is intended by the user, and determine that the movement of the point-of-gaze coordinates with the duration equal to or smaller than the time threshold is a viewpoint movement that is not intended by the user, wherein the measurement unit measures the duration with regard to a movement of the point-of-gaze coordinates with an amount of movement that exceeds a distance threshold, and wherein the amount of movement is based on a plurality of amounts of movement including past amounts of movement.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7 is a flowchart related to a line-of-sight detection operation.

DESCRIPTION OF THE EMBODIMENTS

Figure 1A:
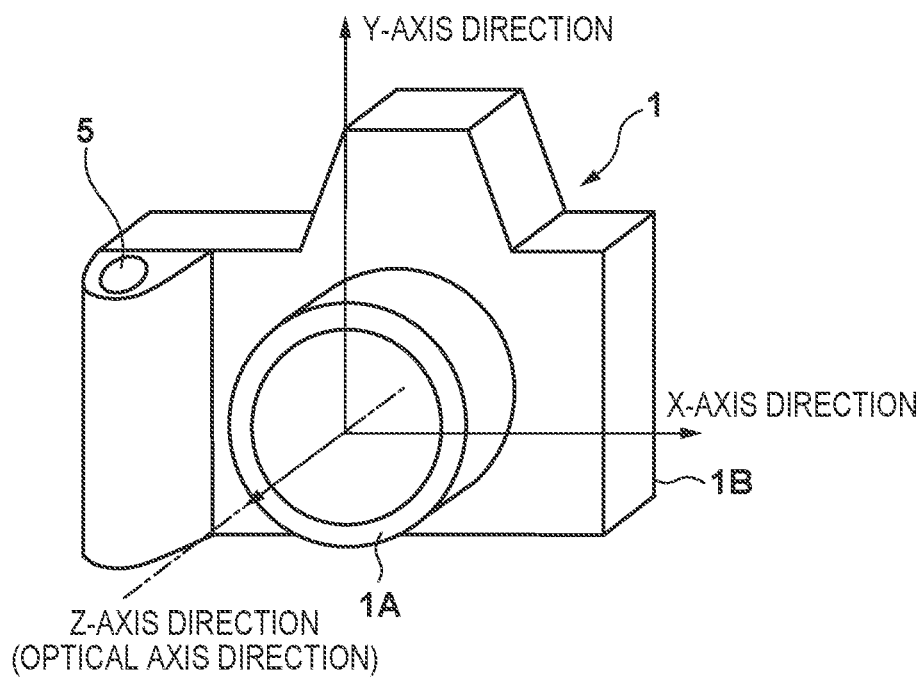
FIGS. 1A and 1B are perspective views showing an example of an external appearance of a camera according to an embodiment.

Hereinafter, exemplary embodiments of the present invention will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments will be described in relation to a case where the present invention is implemented on an interchangeable lens digital still camera. However, the present invention can also be implemented on any electronic devices with a line-of-sight detection function. Such electronic devices include a video camera, a computer device (a personal computer, a tablet computer, a media player, a PDA, or the like), a mobile telephone device, a smartphone, a gaming device, a VR, AR, or MR device, a vehicle-mounted device, and so forth. These are examples, and the present invention can also be implemented on other electronic devices.

First Embodiment

<Description of Configuration>

Figure 1B:
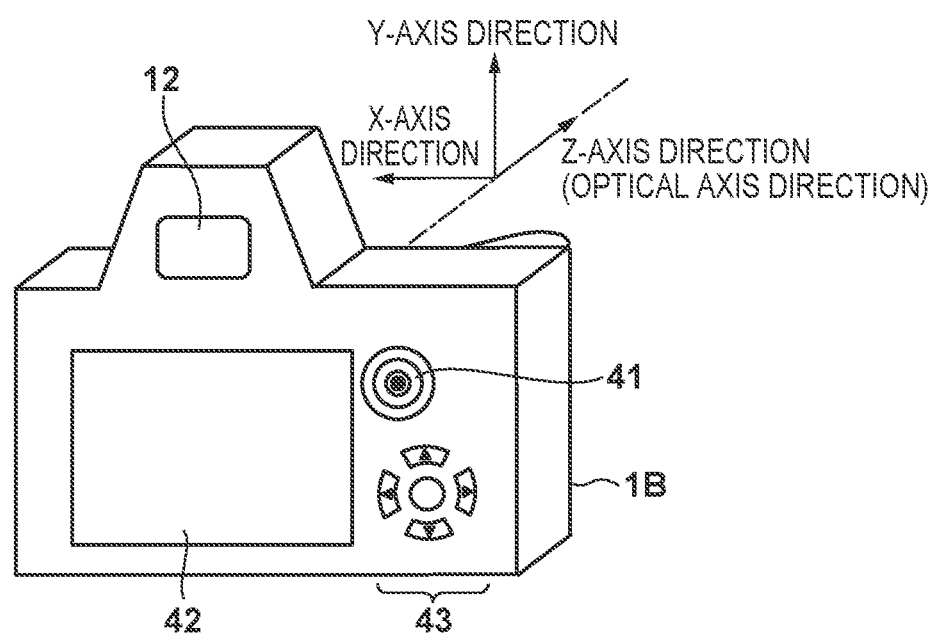

FIG. 1A and FIG. 1B are a perspective view as seen from the front side and a perspective view as seen from the rear side, showing an example of an external appearance of an interchangeable lens digital still camera (hereinafter simply referred to as a camera) 1 according to an embodiment.

The camera 1 includes a camera main body 1B, and a lens unit 1A attachable to and detachable from the camera main body 1B. In the present specification, an XYZ Cartesian coordinate system is defined as a camera coordinate system in which an optical axis of the lens unit 1A acts as a Z axis, an axis along a vertical direction that is perpendicular to the Z axis acts as a Y axis, and an axis that is perpendicular to the Z axis and the Y axis acts as an X axis. Note that the origin of the camera coordinate system may be, but is not limited to, an intersection between an image capturing surface and the optical axis, for example.

A release button 5, a joystick 41, a touch display 42, and directional keys and a determination button 43 are parts of operation members that are provided on the camera main body 1B to accept user operations. Note that the touch display 42 acts as both an operation member and a display element. Hereinafter, the operation members are collectively referred to as an operation unit.

The camera main body 1B includes a look-through viewfinder, and a user can visually confirm a field image by looking through an eyepiece lens 12. The viewfinder may be an optical viewfinder or an electronic viewfinder (EVF). In the case of the optical viewfinder, the field image is an optical image; in the case of the EVF, the field image is an image displayed on a display device, such as an LCD. Hereinafter, a field image that is visually confirmed through the viewfinder (including a state where indexes and the like are displayed in a superimposed manner) will be referred to as a viewfinder image.

Figure 2:
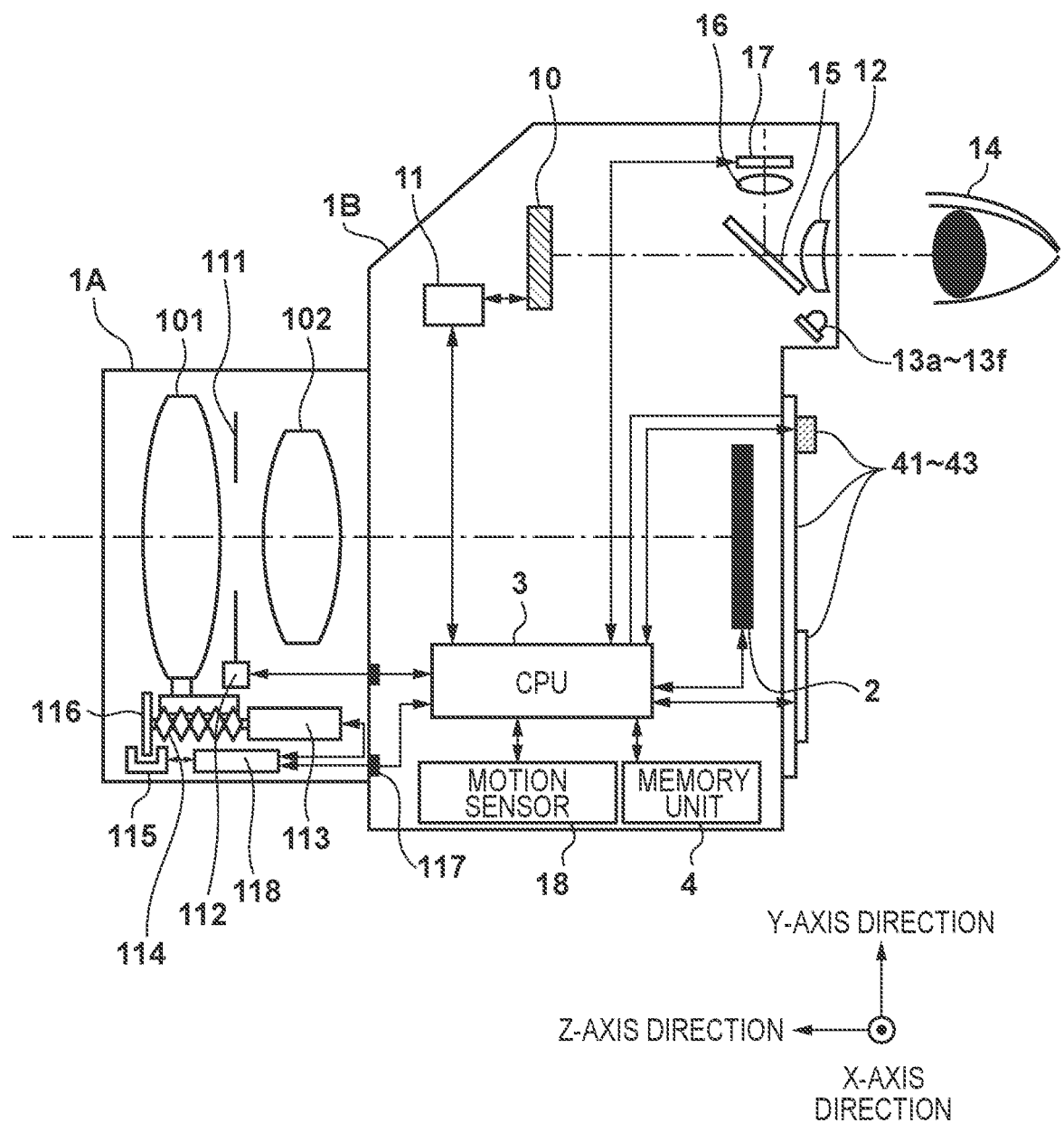
FIG. 2 is a cross-sectional view showing an exemplary configuration of the camera according to an embodiment.

FIG. 2 is a cross-sectional view along a Y-Z plane, schematically showing an example of an internal configuration of the camera 1 mainly in relation to an optical system. When the lens unit 1A is mounted on the camera main body 1B, the lens unit 1A and the camera main body 1B are electrically connected to each other via a mount contact point 117. A power source is supplied from the camera main body 1B to the lens unit 1A via the mount contact point 117. Furthermore, circuits inside the lens unit 1A can communicate with a CPU 3 of the camera main body 1B via the mount contact point 117.

The lens unit 1A includes a movable lens 1a and a fixed lens 1b. Although it is depicted as one lens in the figure, it is actually composed of a plurality of lenses. It is assumed here that the movable lens 1a is a focusing lens; however, other movable lenses, such as a varifocal lens and a blur correction lens, may be included. The movable lens 1a is supported by a lens driving member 114, and is driven in the optical axis direction (the left-right direction in the figure) by a lens driving motor 113. A rotation of a pulse plate 116, which acts in coordination with the lens driving member 114, is detected by a photocoupler 115 and output to a focus adjustment circuit 118. The focus adjustment circuit 118 can detect a driving amount and a driving direction of the movable lens 1a based on an output from the photocoupler 115. Once an instruction about the driving amount and the driving direction of the movable lens 1a has been issued from the CPU 3 of the camera main body 1B, the focus adjustment circuit 118 controls the operations of the lens driving motor 113 based on an output from the photocoupler 115.

In the camera main body 1B, an image sensor 2 is a CCD image sensor or a CMOS image sensor. A plurality of pixels are arranged two-dimensionally in the image sensor 2, and each pixel is provided with one microlens, one color filter, and one or more photoelectric conversion units. The present embodiment adopts a configuration in which each pixel is provided with a plurality of photoelectric conversion units, and signals can be read out for each photoelectric conversion unit. Configuring the pixels in this way makes it possible to generate a captured image, a pair of parallax images, and image signals for phase-difference AF from signals that have been read out from the image sensor 2. The image sensor 2 converts an optical image formed by the lens unit 1A into a group of pixel signals (analog image signals) through photoelectric conversion performed by the plurality of pixels. Furthermore, in the present embodiment, the image sensor 2 has an A/D conversion function; it converts the analog image signals into digital image data, and outputs the digital image data.

A memory unit 4 includes a nonvolatile memory (ROM) and a volatile memory (RAM). The CPU 3 controls the operations of the camera main body 1B and the lens unit 1A and realizes the functions of the camera by reading a program stored in the ROM into the RAM and executing the program. Furthermore, the memory unit 4 also includes a recording medium (e.g., a memory card) for recording image data and sound data obtained through shooting. The CPU 3 controls the operations of the focus adjustment circuit 118 and a diaphragm driving unit 112 via the mount contact point 117.

The nonvolatile memory in the memory unit 4 may be rewritable. The nonvolatile memory stores a program executed by the CPU 3, various types of setting values, image data of a GUI (Graphical User Interface), line-of-sight correction data for correcting individual differences in the line of sight, and so forth.

A display element 10 is an LCD or an organic EL display panel, and displays shot images such as live-view images, a menu screen, various types of information, and so forth. A display element driving circuit 11 drives the display element 10 under control of the CPU 3. As the display element 10 is provided inside the camera main body 1B, an eyepiece unit for observing the display element 10 from the outside of the camera main body 1B is provided. The eyepiece unit includes the eyepiece lens 12 and illumination light sources 13a to 13f for line-of-sight detection. Furthermore, the eyepiece unit also includes an optical splitter 15 and an eyeball image sensor 17 for shooting images of an eyeball.

The illumination light sources 13a to 13f are a plurality of infrared LEDs provided around the eyepiece lens 12, and illuminate an eyeball 14 of a user looking into the eyepiece unit with infrared light. An eyeball image, which is obtained as a result of reflection of the infrared light from the illumination light sources 13a to 13f off the eyeball 14, reflects off the optical splitter 15 and is shot by the eyeball image sensor 17 via a light receiving lens 16 placed on the upper side. The light receiving lens 16 places the pupil of the eyeball 14 of the user and the eyeball image sensor 17 into a conjugate image forming relationship. The eyeball image sensor 17 is configured to include a plurality of pixels that are arranged two-dimensionally, and to shoot an image based on the infrared light. The number of pixels in the eyeball image sensor 17 may be smaller than the number of pixels in the image sensor 2. The line-of-sight direction of the eyeball 14 can be detected based on a positional relationship between the corneal reflection and the pupil in the eyeball image obtained by the eyeball image sensor 17.

The illumination light sources 13a and 13b, the optical splitter 15, the light receiving lens 16, the eyeball image sensor 17, the CPU 3, and a later-described line-of-sight detection circuit 201 compose a line-of-sight detection apparatus.

A motion sensor 18 is a sensor, such as a gyroscope and an acceleration sensor, for detecting a motion of the camera main body 1B. An output of the motion sensor 18 is supplied to the CPU 3. The CPU 3 can learn of a motion of the camera main body 1 in the axis direction and around the axis, with respect to each of the X, Y, and Z axes, from an output of the motion sensor 18. Note that a sensor for camera shake correction can also be used as the motion sensor 18.

Figure 3:
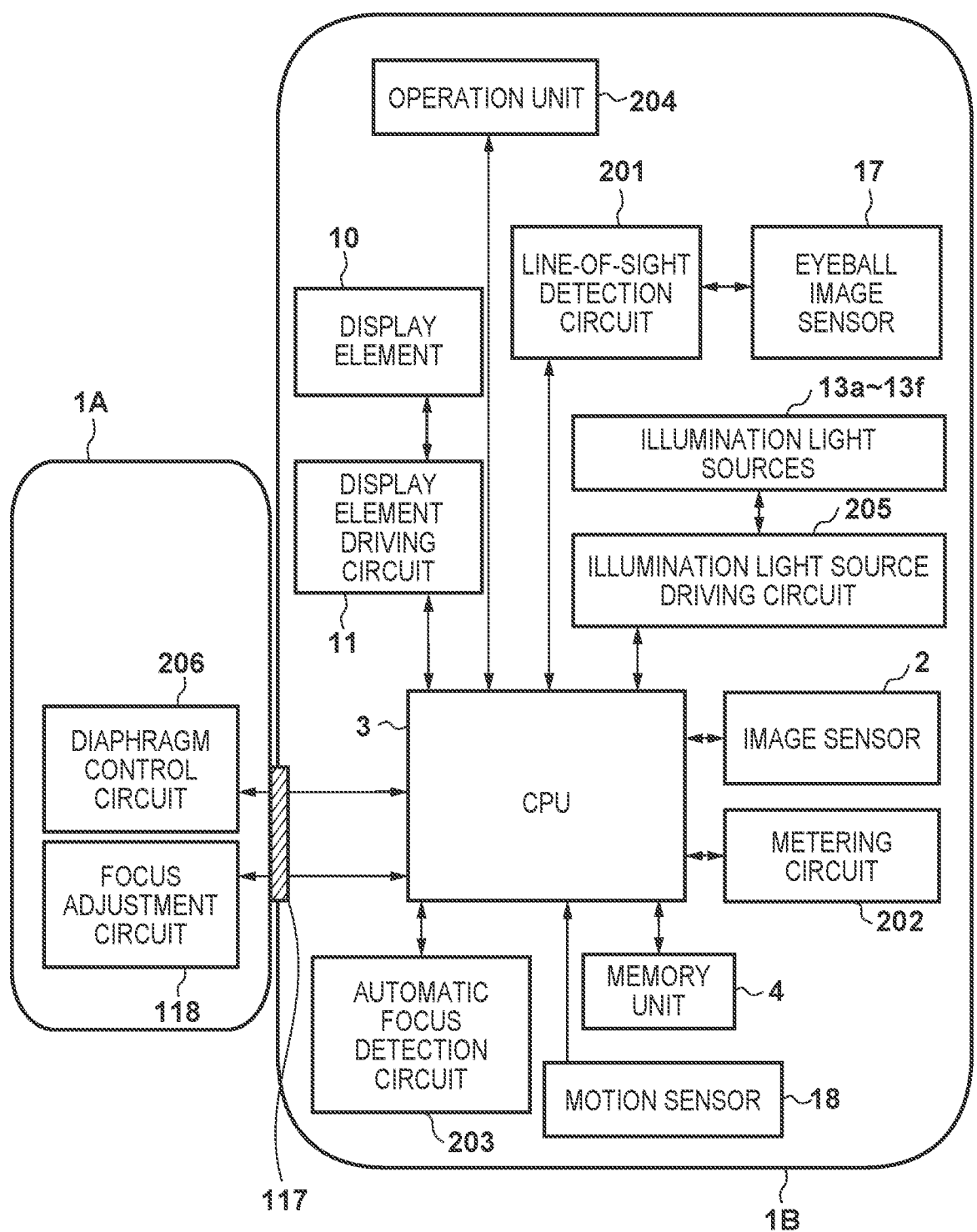
FIG. 3 is a block diagram showing an exemplary functional configuration of the camera according to an embodiment.

FIG. 3 is a block diagram showing an exemplary configuration of the camera according to the present embodiment, with a focus on electrical circuits. The line-of-sight detection circuit 201, a metering circuit 202, an automatic focus detection circuit 203, an operation unit 204, the display element driving circuit 11, and an illumination light source driving circuit 205 are connected to the CPU 3. Furthermore, the focus adjustment circuit 118 and a diaphragm control circuit 206 (included in the diaphragm driving unit 112), which are provided in the photographing lens 1, are electrically connected to the CPU 3 via the mount contact point 117.

The line-of-sight detection circuit 201 applies A/D conversion to analog image signals of an eyeball image obtained from the eyeball image sensor 17 (CCD-EYE), and transmits the result of the A/D conversion as digital image data to the CPU 3. The CPU 3 detects feature points necessary for line-of-sight detection from the digital image data of the eyeball image in accordance with a known algorithm, and detects the line-of-sight direction of the user from the positions of the respective feature points.

The metering circuit 202 generates luminance information as preset evaluation values for exposure control based on image data obtained from the image sensor 2, and outputs the luminance information to the CPU 3. The CPU 3 executes automatic exposure control (AE) processing based on the luminance information, and decides on shooting conditions. The shooting conditions are a shutter speed, an f-number, and sensitivity in the case of still image shooting, for example. The CPU 3 controls the f-number (the aperture level) of a diaphragm 111 of the photographing lens 1 based on the decided shooting conditions. Furthermore, the CPU 3 also controls the operations of a mechanical shutter inside a main body 20.

The automatic focus detection circuit 203 generates image signals for phase-difference AF based on image data obtained from the image sensor 2, and outputs the image signals to the CPU 3. The CPU 3 calculates a defocus amount based on the phase difference between the image signals for phase-difference AF. This is a known technique known as image capturing surface phase-difference AF. In the present embodiment, as one example, it is assumed that there are 180 focus detection points at the positions on an image capturing surface that correspond to the locations shown in a viewfinder image of FIG. 4 (described later); however, no limitation is intended by this.

The operation unit 204 is a collective term for a plurality of input devices (buttons, switches, dials, and so forth) that can be operated by the user, including the release button 5 and the operation members 41 to 43 that have been described earlier. Parts of the input devices included in the operation unit 204 have names that agree with assigned functions; typical examples include the release button 5, a power switch, a menu button, the directional keys and determination button 43, and so forth. Operations performed on the input devices included in the operation unit 204 are monitored by the CPU 3. Upon detecting the operations performed on the input devices, the CPU 3 executes processing corresponding to the detected operations.

The release button 5 includes a first shutter switch (SW1) that is turned ON in a half-pressed state, and a second shutter switch (SW2) that is turned ON in a fully-pressed state. When the CPU 3 has detected that SW1 has been turned ON, it executes a preparation operation for still image shooting. the preparation operation includes AE processing, AF processing, and the like. Furthermore, when the CPU 3 has detected that SW2 has been turned ON, it executes an operation for shooting and recording still images in accordance with the shooting conditions that were decided on in the AE processing.

The illumination light source driving circuit 205 controls light emitting operations of the illumination light sources 13a to 13f under control of the CPU 3.

Figure 4:
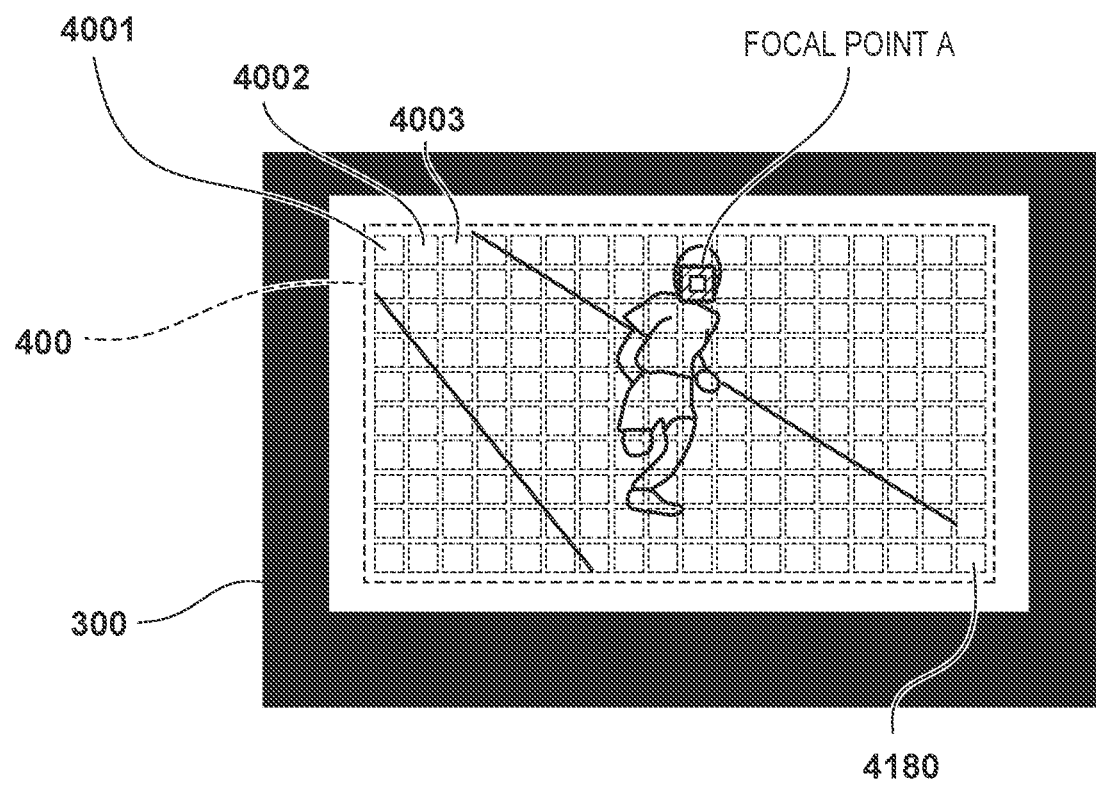
FIG. 4 is a diagram showing an example of a viewfinder image of the camera according to an embodiment.

FIG. 4 is a diagram showing an example of a viewfinder image observed via the eyepiece lens 12. Here, the viewfinder image is an image displayed on the display element 10, and various types of indexes are superimposed thereon. Note that moving images that are displayed in order for the display element 10 or the touch display 42 to function as the EVF are referred to as live-view images.

In FIG. 4, 300 indicates a field mask, 400 indicates an index indicative of a range in which focus detection is possible, and 4001 to 4180 indicate 180 eye-tracking targets (AF frames) displayed at positions corresponding to points at which focus detection is possible (focus detection points). Furthermore, an AF frame corresponding to the current point-of-gaze is displayed in a highlighted manner, so that it is shown as an estimated point-of-gaze A.

<Description of Line-of-Sight Detection Operation>

Figure 5:
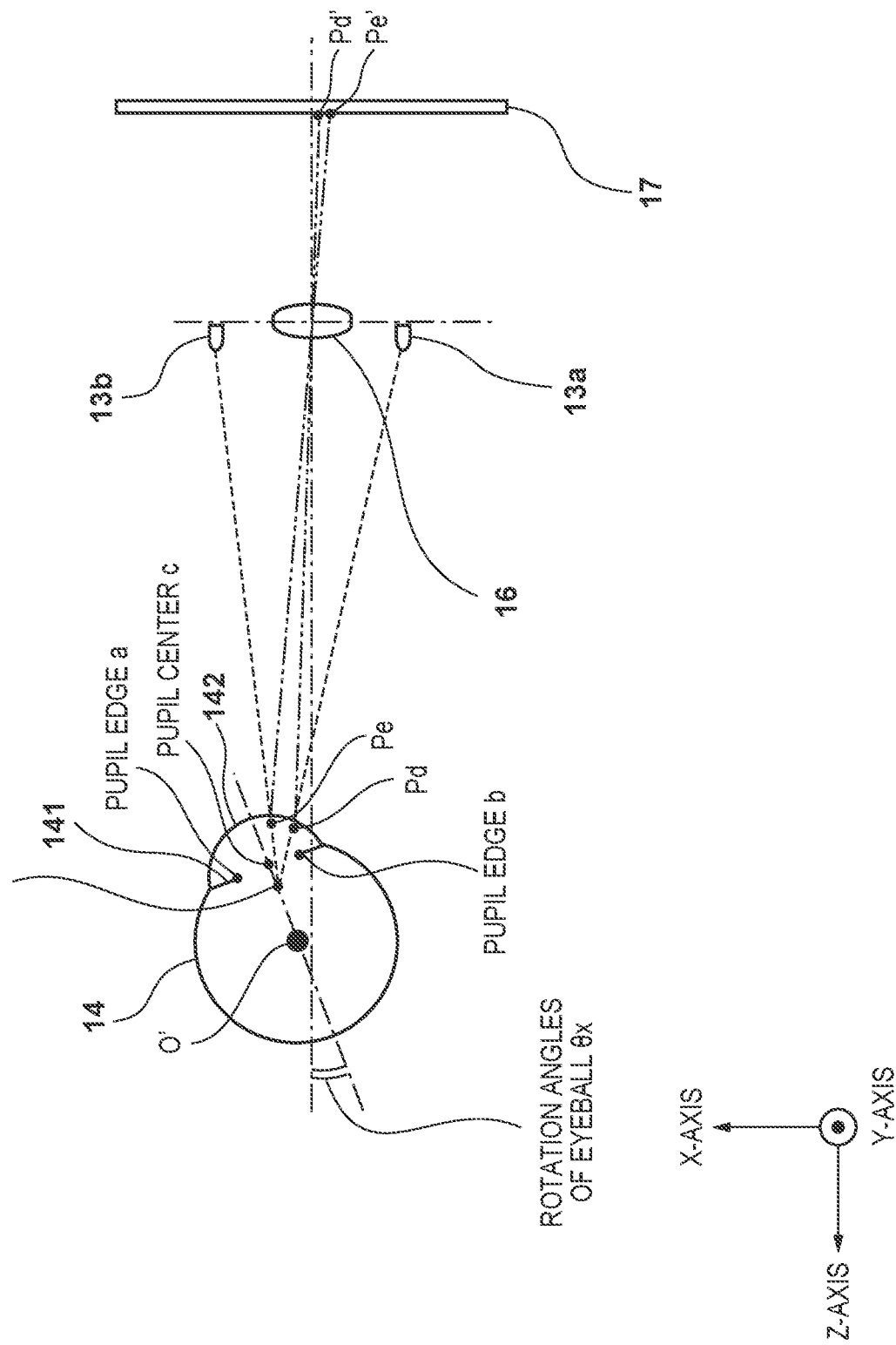
FIG. 5 is a diagram for describing the principle of a line-of-sight detection method according to an embodiment.
Figure 6:
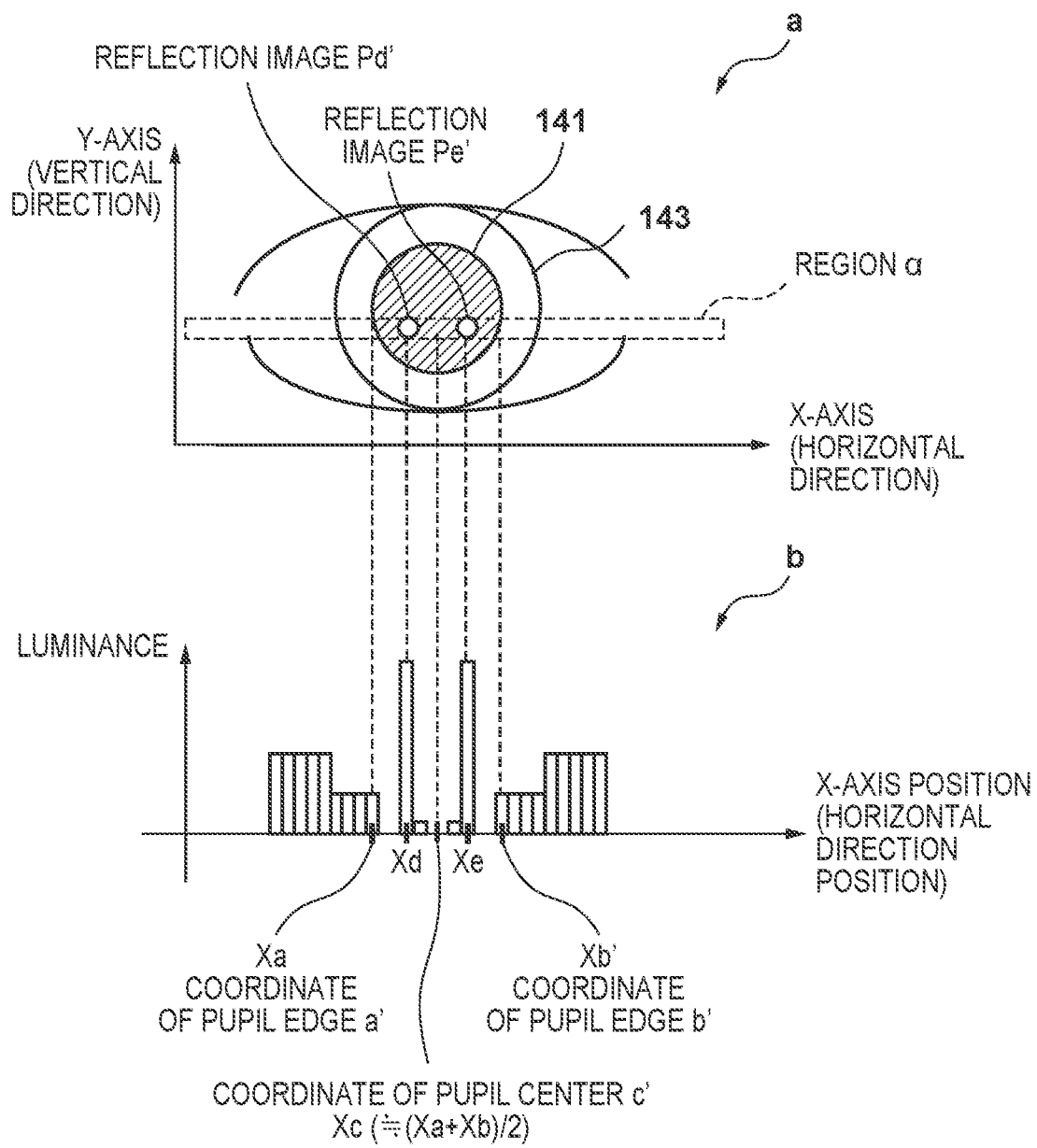
FIG. 6 is a diagram showing an example of an eyeball image obtained upon detection of a line of sight.

A description is now given of a line-of-sight detection operation using FIG. 5 to FIG. 7. FIG. 5 is a diagram related to the principle of line-of-sight detection. The illumination light sources 13a to 13f are placed so that they are substantially symmetric with respect to the optical axis of the light receiving lens 16, and irradiate the eyeball 14 of the user with infrared light. In FIG. 5, only the illumination light sources 13a and 13b are shown. The light receiving lens 16 forms an eyeball image based on the infrared light that reflected off the eyeball 14 on an image capturing surface of the eyeball image sensor 17.

a in FIG. 6 is a schematic diagram of the eyeball image formed by the light receiving lens, and b in FIG. 6 is a schematic diagram of a luminance distribution in a region a in a.

FIG. 7 is a flowchart related to a viewpoint detection operation. The viewpoint detection operation can be executed when, for example, a state where an object is in proximity to the eyepiece lens 12 has been detected. The state where an object is in proximity to the eyepiece lens 12 can be detected by using any known method, such as by using a proximity sensor placed in the vicinity of the eyepiece lens 12, for example. The viewpoint detection operation may be started in response to an instruction issued by a user via the operation unit 204.

In S1, the CPU 3 causes one or more of the illumination light sources 13a to 13f to emit light via the illumination light source driving circuit 205. Here, for the sake of convenience, it is assumed that the illumination light sources 13a and 13b shown in FIG. 5 are caused to emit light. As a result, the illumination light sources 13a and 13b emit infrared light toward the outside of the camera main body 1B. The infrared light reflects off the eyeball of the user looking into the eyepiece lens 12, further reflects off the optical splitter 15, and becomes incident on the light receiving lens 16.

In S2, the CPU 3 performs shooting using the eyeball image sensor 17. The eyeball image sensor 17 converts the eyeball image formed by the light receiving lens 16 into image signals. The line-of-sight detection circuit 201 applies A/D conversion to the image signals, and the resultant image signals are input to the CPU 3 as eyeball image data.

In S3, the CPU 3 obtains, from the eyeball image data obtained in S2, the s of corneal reflection images Pd' and Pe' of the illumination light sources 13a and 13b, and the coordinates of a point corresponding to a pupil center c. The eyeball image obtained by the eyeball image sensor 17 includes reflection images Pd' and Pe' corresponding to images Pd and Pe of the illumination light sources 13a and 13b that appear on a cornea 142 (a in FIG. 6).

As shown in a in FIG. 6, it is assumed that the horizontal direction and the vertical direction coincide with the X axis and the Y axis, respectively. Here, it is assumed that the X-axis coordinates of the centers of the reflection images Pd' and Pe' of the illumination light sources 13a and 13b included in the eyeball image are Xd and Xe. Furthermore, it is assumed that the X-axis coordinates of images a' and b' of pupil edges a and b, which are the edges of a pupil 141, are Xa and Xb.

As shown in b in FIG. 6, the luminance of coordinates Xd and Xe, which are equivalent to the reflection images Pd' and Pe' of the illumination light sources 13a and 13b, is extremely high compared to the luminance at other positions. On the other hand, the luminance of the range of the coordinates Xa to Xb, which is equivalent to the region of the pupil 141, is extremely low, except for the coordinates Xd and Xe. Furthermore, the range in which the coordinates are smaller than Xa and the range in which the coordinates are larger than Xb, which are equivalent to the region of an iris 143 outside the pupil 141, have intermediate luminance between the luminance of the reflection images of the illumination light sources and the luminance of the pupil.

Based on such characteristics of luminance levels in the X-axis direction, the CPU 3 can detect the X-axis coordinates Xd and Xe of the reflection images Pd' and Pe' of the illumination light sources 13a and 13b, as well as the X-axis coordinates Xa and Xb of images a' and b' of the pupil edges a and b, from the eyeball image. Furthermore, in the intended use according to the present embodiment, the rotation angle θx of the optical axis of the eyeball 14 with respect to the optical axis of the light receiving lens 16 is relatively small. In this case, the X-axis coordinate Xc of an image c' of a pupil center c in the eyeball image can be denoted by Xc≈(Xa+Xb)/2. In this way, the CPU 3 can obtain the coordinates of the corneal reflection images Pd' and Pe' of the illumination light sources 13a and 13b, as well as the X-axis coordinate of the image c' of the pupil center c, from the eyeball image.

Next, in S4, the CPU 3 calculates an image formation magnification β of the eyeball image. β is the magnification that is decided on based on the position of the eyeball 14 relative to the light receiving lens 16, and can be obtained as a function of an interval (Xd—Xe) between the reflection images Pd' and Pe' of the illumination light sources.

Furthermore, in S5, the CPU 3 calculates the rotation angles of the eyeball. The X-axis coordinate of the midpoint between the images Pd and Pe of the illumination light sources on the cornea 142 substantially coincides with the X-axis coordinate of the center of curvature O of the cornea 142. Therefore, provided that a normal distance from the center of curvature O of the cornea 142 to the center c of the pupil 141 is Oc, the rotation angle θx of the optical axis of the eyeball 14 on the Z-X plane can be obtained from the following relational expression.

$$\beta * Oc * \mathrm{SIN}\theta x \approx \{(Xd+Xe)/2\} - Xc$$

Although FIG. 5 and FIG. 6 show an example in which the rotation angle θx on a plane perpendicular to the Y axis is calculated, a rotation angle θy on a plane perpendicular to the X axis can also be calculated in a similar manner. In this way, the CPU 3 obtains the rotation angles θx and θy of the eyeball. The line-of-sight direction can be specified from the rotation angles of the eyeball.

In S6, the CPU 3 obtains a line-of-sight correction coefficient from the memory unit 4. The line-of-sight correction coefficient is a coefficient for correcting individual differences in the line of sight among users. The line-of-sight correction coefficient is generated through a calibration operation, and is stored into the memory unit 4 before the line-of-sight detection operation is started. In a case where the memory unit 4 stores line-of-sight correction coefficients in relation to a plurality of users, the line-of-sight correction coefficient corresponding to the current user is used by, for example, making an inquiry to the user at an arbitrary timing.

In S7, using the rotation angles θx and θy of the eyeball obtained in S5, the CPU 3 obtains the coordinates of a user's point-of-gaze on the display element 10 (or the position of a user's point-of-gaze on a displayed image). Furthermore, assuming that the coordinates of the point-of-gaze are the coordinates (Hx, Hy) corresponding to the center c of the pupil 141 on the display element 10, they can be calculated as follows.

$$Hx = m \times (Ax \times \theta x + Bx)$$

$$Hy = m \times (Ay \times \theta y + By)$$

Here, the coefficient m is a conversion coefficient for converting the rotation angles θx and θy into the coordinates corresponding to the center c of the pupil 141 on the display element 10, and is determined based on the configuration of the viewfinder optical system of the camera. The coefficient m can be stored in the memory unit 4 in advance. Furthermore, Ax, Bx, Ay, and By are the line-of-sight correction coefficients obtained in S6.

In S8, the CPU 3 stores the point-of-gaze coordinates (Hx, Hy) calculated in S7 into the memory unit 4, and ends the line-of-sight detection operation. Note that the line-of-sight detection operation is executed repeatedly, and the point-of-gaze coordinates are updated sequentially. Most recent chronological data of the point-of-gaze coordinates during a certain time period may be held in the memory unit 4.

The description provided here pertains to an example in which the point-of-gaze coordinates are detected based on the positions of the reflection images of the illumination light sources 13a an 13b and the position of the pupil image. However, the point-of-gaze coordinates can be detected using any known method for obtaining the rotation angles of the eyeball from a captured eyeball image.

<Subject Detection Function>

Next, a subject detection function included in the camera 1 will be described. The subject detection function is a function for detecting a candidate for a main subject from among subjects included in a shooting range. The subject detection function is realized by the CPU 3 executing a program stored in the memory unit 4.

For example, the CPU 3 can detect an image region that has features of a specific subject (a feature region) as a candidate region of a main subject by applying known subject recognition processing to data of a captured image. For example, in a case where the specific subject is a face of a person or an animal, the CPU 3 can detect a face region as a candidate region of a main subject by applying, for example, a known face recognition technique or pupil recognition technique to data of a captured image. Note that a subject to be recognized is not limited to a face.

Furthermore, the CPU 3 may detect a candidate region of a main subject based on distance information of a shooting range. For example, in a case where the image sensor 2 is configured to be capable of obtaining a pair of parallax images, distance information of a captured image can be obtained on a per-pixel basis from the pair of parallax images using a known method. Furthermore, the CPU 3 may use distance information that is obtained by using a ranging sensor, such as LIDAR. The CPU 3 can exclude a background region based on the distance information of the shooting range, and detect each of the regions for which similar pieces of distance information have been gathered as a candidate region of a main subject.

Alternatively, the CPU 3 may detect a candidate region of a main subject by inputting data of a captured image to trained neural networks which have been prepared for respective subject types and which have been stored in, for example, the memory unit 4.

The methods of detecting a candidate region of a main subject that have been listed above are merely examples, and other methods may be used. Furthermore, two or more detection methods may be implemented in combination.

It is assumed in the present embodiment that, among the detected candidate regions of the main subject, a candidate region including the point-of-gaze coordinates is used as a main subject region in focus detection, exposure control, and the like. Furthermore, the main subject region is used as a subject region to be tracked in subject tracking processing in moving image shooting and continuous shooting. The subject tracking processing is processing for tracking a subject region to be tracked throughout a plurality of frames. The CPU 3 can specify the position of a subject region to be tracked inside a shot image by, for example, applying template matching that uses the subject region to be tracked as a template to data of the shot image.

<Problem That Can Arise in Deciding on Main Subject Region Based on Point-of-Gaze Coordinates>

When a candidate region including the point-of-gaze coordinates is decided on as a main subject region in a case where a plurality of candidate regions of a main subject have been detected, the following problem can arise.

Figure 8A:
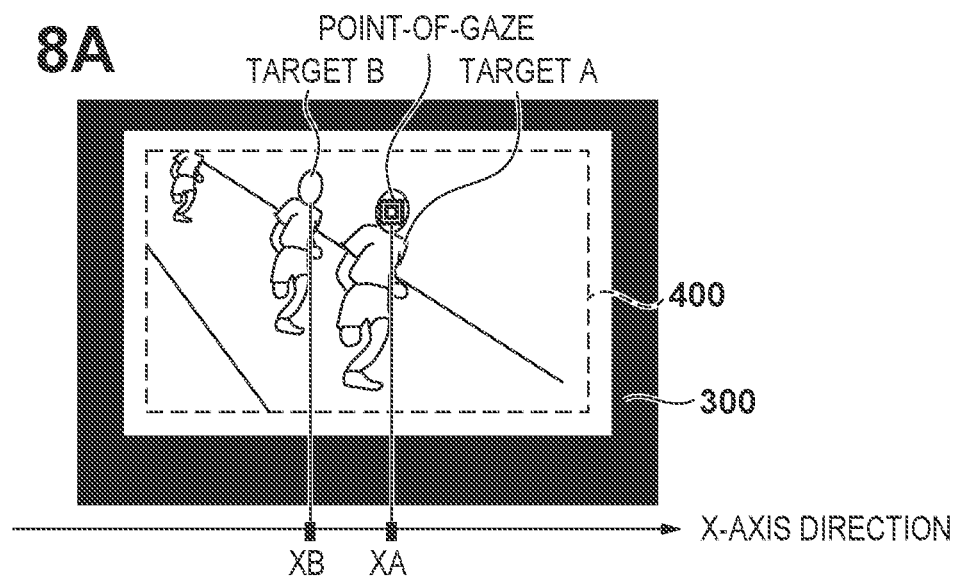
FIGS. 8A to 8C are diagrams showing an example of a movement of a point-of-gaze coordinates in a scene where a plurality of subjects exist. gaze coordinates in a scene where a plurality of subjects exist.
Figure 8B:
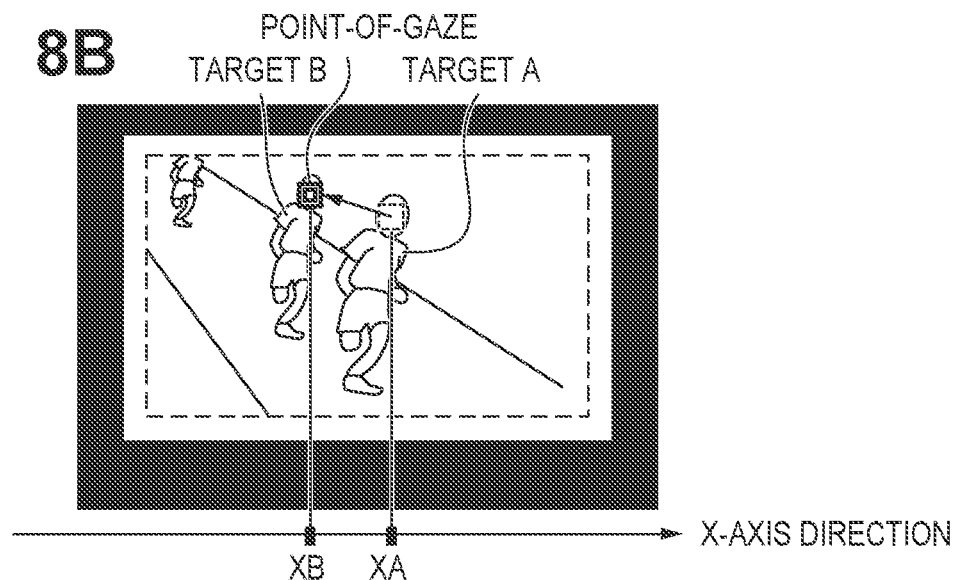
Figure 8C:
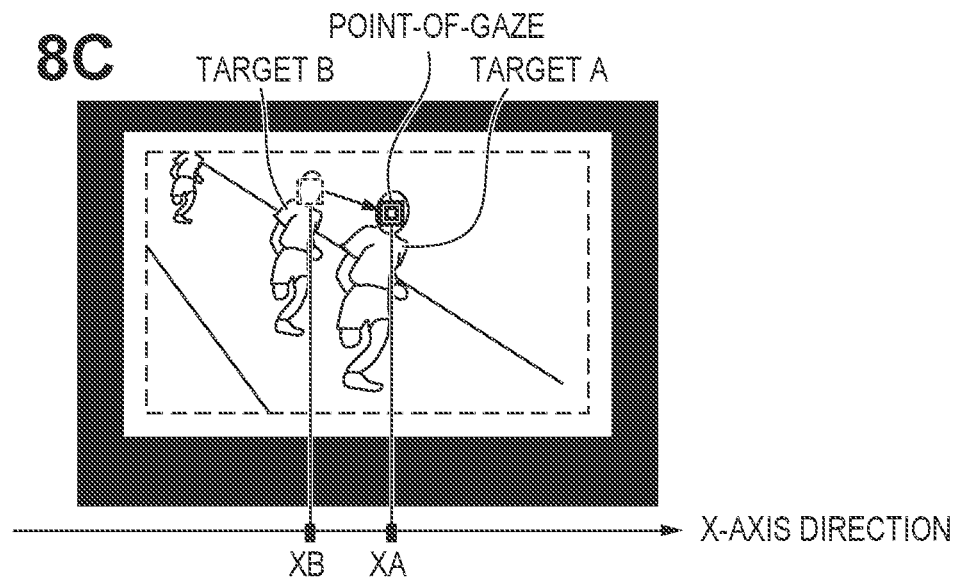

FIG. 8A to FIG. 8C show viewfinder images related to a scene of a track competition that involves a plurality of runners, as one example of a shooting scene in which a plurality of candidate regions of a main subject are detected. It is assumed that a target A is an athlete in the first place, and a target B is an athlete in the second place. Furthermore, it is assumed that the face regions of the target A and the target B have been detected as candidate regions of a main subject.

In a state shown in FIG. 8A, the user is gazing at the target A with the intention to focus on the target A. The CPU 3 decides on the face region of the target A, including the point-of-gaze coordinates, as a main subject region, and executes focus detection processing so as to focus on the face region of the target A, as well as exposure control so that exposure in the face region of the target A becomes appropriate exposure. The results of these focus detection processing and exposure control are immediately reflected in the shooting conditions for moving images. Here, the moving images may be moving images for recording, or may be moving images for live-view display.

In a case where a change has occurred in the scene, the user may shift his/her line of sight to a location where the change has occurred unintentionally. For example, in a case where the athlete in the second place (the target B) approaches the athlete in the first place (the target A) in the state of FIG. 8A, the line-of-sight may be shifted from the target A to the target B unintentionally, and then quickly return to the target A again, as shown in FIG. 8B and FIG. 8C. In this case, although the movement of the line of sight to the target B generally takes place in a fairly short period of time, if the CPU 3 changes the main subject region to the face region of the target B in reaction to this movement of the line of sight, the subject to be focused frequently changes from the target A to the target B, and then to the target A. Changing of the subject to be focused in a short period of time is not favorable both in a case where moving images are used as viewfinder images, and in a case where moving images are recorded.

The present embodiment provides a method of suppressing a change in a main subject different from the user's intention by determining whether a change in a subject region gazed by the user is intentional based on an amount of change in the point-of-gaze coordinates and a time period for which the change has continued. The details will be described below.

Figure 9A:
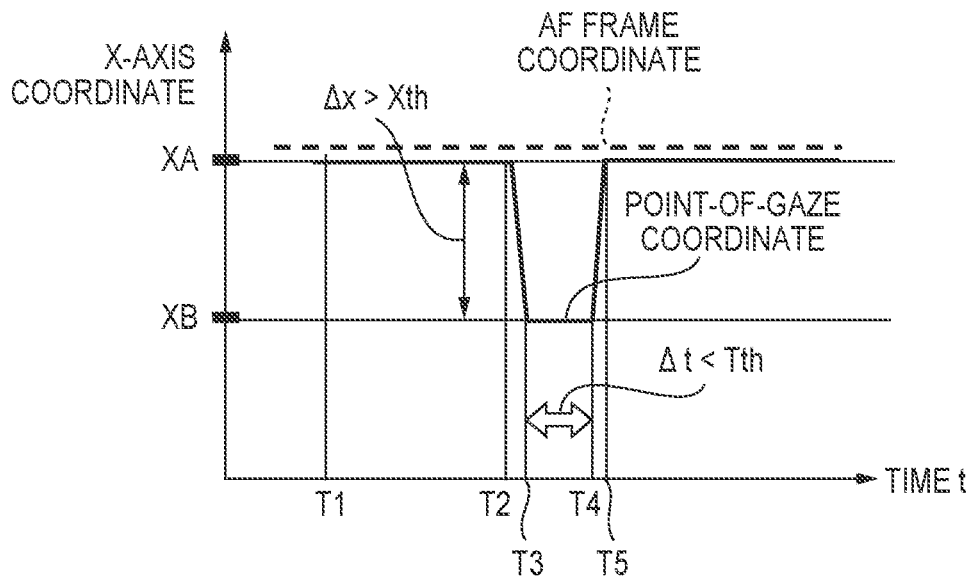
FIGS. 9A and 9B are diagrams showing chronological changes in a point-of-gaze coordinates and an AF frame position in the scenes shown in FIG. 8A to FIG. 8C.

(1) Determination Based on Amount of Change in Point-of-Gaze Coordinates and Time Period of Change FIG. 9A is a diagram showing temporal changes in the point-of-gaze coordinates and the central coordinates of an AF frame used in focus detection in a period from FIG. 8A to FIG. 8C. The horizontal axis represents time, and the vertical axis represents X-axis coordinates. Furthermore, the coordinates XA and XB correspond to the coordinates of the same names shown in FIG. 8A to FIG. 8C. In the figures, a solid line indicates the X-axis coordinate of the point-of-gaze, whereas a dash line indicates the central X-axis coordinate of the AF frame used in focus detection.

A section between time T1 to time T2 corresponds to the state of FIG. 8A where the user is gazing at the face of the target A. Therefore, the X-axis coordinate of the point-of-gaze is stable at XA. Thereafter, the user starts to move his/her line-of-sight to the face region of the target B at time T2, and gazes at the face region of the target B as shown in FIG. 8B in a section between time T3 and time T4. The user starts to move his/her line of sight to the face region of the target A again at time T4, and reverts to the state where he/she gazes at the face region of the target A as shown in FIG. 8C in a section from time T5.

The CPU 3 continuously executes the above-described point-of-gaze detection processing, and monitors whether the point-of-gaze has moved. Then, in a case where it is determined that the point-of-gaze has moved, the CPU 3 determines whether the amount of movement of the point-of-gaze per predetermined unit time (which is assumed to be the amount of movement of the X-axis coordinate here) $\Delta X$ exceeds a preset threshold Xth (a distance threshold). Here, the threshold Xth may be the magnitude of the involuntary fine motion. The involuntary fine motion is the fine shaking of the eye that constantly occurs involuntarily even if the user thinks he/she is staring at one point. That is to say, this determination is equivalent to determination of whether the movement of the point-of-gaze is a significant viewpoint movement.

In the example of FIG. 9A, in the section from time T2 to time T3, the amount of movement $\Delta X$ of the point-of-gaze coordinates per time satisfies $\Delta X > Xth$, and the CPU 3 determines that the movement is the significant viewpoint movement. On the other hand, in a case where the amount of movement $\Delta X$ satisfies $\Delta X \leq Xth$, the CPU 3 determines that the movement of the point-of-gaze coordinates is caused by the involuntary fine motion, and continues the monitoring operation.

In a case where it has been determined that a significant viewpoint movement has occurred, the CPU 3 subsequently measures a retention time period $\Delta t$ of the point-of-gaze coordinates after the movement. Here, the retention time period is a time period of continuation of (a duration of) a state where the amount of movement $\Delta X$ of the point-of-gaze coordinates is equal to or smaller than the threshold Xth. Then, the CPU 3 determines whether the retention time period $\Delta t$ of the point-of-gaze coordinates after the movement has exceeded a predetermined time period Tth (a time threshold). In the case of a reflexive line-of-sight movement caused by a scene change and the like, the line of sight returns to the original position after a short retention time period $\Delta t$. Therefore, if the retention time period $\Delta t$ is equal to or shorter than the threshold Tth (equal to or shorter than the time threshold), the CPU 3 determines that the line-of-sight movement is not made under the intention of the user, but is reflexive. Then, the CPU 3 does not change the main subject region based on the point-of-gaze coordinates after the movement. On the other hand, if the retention time period $\Delta t$ is equal to or longer than the threshold Tth, the CPU 3 determines that the viewpoint movement has been made under the intention of the user. In this case, the CPU 3 changes the main subject region based on the point-of-gaze coordinates after the movement.

As the sequence of changes in the point-of-gaze coordinates from FIG. 8A to FIG. 8C have been made reflexively as a result of a scene change, the retention time period $\Delta t$ of the point-of-gaze coordinates after the movement (the length from time T3 to time T4) is shorter than the threshold Tth. Therefore, the CPU 3 does not change the main subject region based on the movement of the point-of-gaze coordinates to the coordinate XB, and the position of the AF frame is maintained at the position at time T2 before the movement of the point-of-gaze coordinates. Note that the value of the threshold Tth can be, for example, decided on experimentally in advance, and stored into the memory unit 4.

As described above, in a case where there has been a significant movement of the point-of-gaze coordinates, whether the movement of the point-of-gaze coordinates has been made under the intention of the user is determined based on the magnitude of the amount of movement per time, and on the retention time period of the point-of-gaze coordinates after the movement. Then, in a case where it has not been determined that the movement of the point-of-gaze coordinates has been made under the intention of the user, the main subject region is not changed based on the point-of-gaze coordinates after the movement, thereby suppressing frequent changes in the main subject region caused by a reflexive (temporary) movement of the point-of-gaze.

Here, whether to change the main subject region based on the point-of-gaze coordinates after the movement is determined based on the length of the retention time period Δt of the point-of-gaze coordinates after the movement; however, this determination may be made using other methods. For example, an average value of point-of-gaze coordinates during a predetermined period in the past may be used as the point-of-gaze coordinates after the movement.

For example, assume that the amounts of fluctuation in the point-of-gaze coordinates in the X direction in five most recent frames are ΔX(t−5), ΔX(t−4), ΔX(t−3), ΔX(t−2), and ΔX(t−1), and the amount of fluctuation in the point-of-gaze coordinates in the X direction in the current frame is ΔX(t).

Then, the CPU 3 can determine whether the line-of-sight movement has been made intentionally based on whether the following is larger than the threshold Xth.

$$\Delta X'(t)=\{\Delta X(t-5)+\Delta X(t-4)+\Delta X(t-3)+\Delta X(t-2)+\Delta X(t-1)+\Delta X(t)\}/6$$

For example, the CPU 3 executes processing for determining whether ΔX'(t)>Xth, in place of the determination of the amount of movement ΔX and the retention time period Δt. Then, if it is determined that ΔX'(t)>Xth, it can be determined that the intentional line-of-sight movement has been made, and the main subject region can be changed based on the point-of-gaze coordinates X(t) in the current frame.

As described above, by averaging the amounts of fluctuation in the point-of-gaze coordinates in relation to a plurality of frames, the influence of a sudden and short-lasting change in the point-of-gaze coordinates can be suppressed. Therefore, a change in the main subject region caused by a reflexive line-of-sight movement can be suppressed. Such averaging of the amounts of fluctuation in the point-of-gaze coordinates can also be said to be an operation of applying a low-pass filter of the time direction to chronological data of the amounts of fluctuation. Note that no limitation is intended by averaging; any filter or computation that can realize smoothing of chronological data, such as a median filter, can be applied to the amounts of fluctuation in the point-of-gaze coordinates.

Note that the length of chronological data (the number of frames) to which a filter is applied may be fixed, or may be set dynamically. For example, it may be set dynamically based on the type of a main subject, the type of a shooting scene, a motion of the camera, and so forth.

First Modification Example: Deciding on Threshold Tth Based on Type of Main Subject and/or Shooting Scene Next, a description is given of a modification example in which the threshold Tth is decided on dynamically based on the type of a main subject and/or a shooting scene in the above-described determination method (1).

Figure 9B:
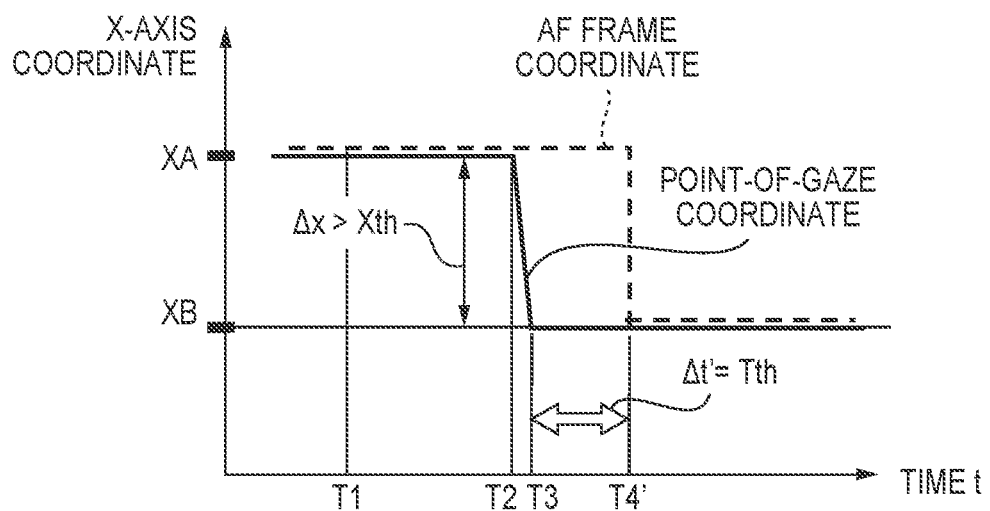

FIG. 9B, which is a diagram similar to FIG. 9A, depicts a case where the point-of-gaze coordinates does not return to the original position at and after time T4. This is equivalent to a case where the user has intentionally moved his/her line of sight from the target A to the target B in the examples of FIG. 8A to FIG. 8C. In this case, according to the determination method (1) described earlier, the main subject region is changed based on the point-of-gaze coordinates XB at time T4', or when the threshold Tth has elapsed since time T2. As a result, as indicated by a dash line in FIG. 9B, the position of the AF frame changes from time T4'.

With the determination method (1), a change in the main subject region caused by a reflexive movement of the point-of-gaze coordinates can be suppressed by introducing the threshold Tth. However, in a case where the point-of-gaze coordinates has been moved intentionally, the threshold Tth becomes a delay until the intention is reflected. Therefore, the threshold Tth should be set to be short in a range where the advantageous effects of suppression of a change in the main subject region caused by a reflexive movement of the point-of-gaze coordinates can be received.

Furthermore, the appropriate value of the threshold Tth can vary depending on the type of the main subject. For example, the ability to track a line-of-sight movement is more important than stability with regard to a main subject with which the change in the direction and the speed of movement has no or little regularity (the movement is difficult to predict), such as a child and a dog. Therefore, the shorter the threshold Tth, the more appropriate. On the other hand, stability is more important than the ability to track a line-of-sight movement with regard to a main subject with which the change in the direction and the speed of movement has regularity (is easy to predict), such as a human adult and a horse. Therefore, the longer the threshold Tth, the more appropriate.

Similarly, a shorter threshold Tth is more appropriate in the case of shooting of a scene where the change in the direction and the speed of movement of a main subject has no or little regularity (the movement is difficult to predict), such as succor and basketball. On the other hand, a longer threshold Tth is more appropriate in the case of shooting of a scene where the change in the direction and the speed of movement of a main subject has regularity (is easy to predict), such as field and ice skating competitions.

Therefore, in the present modification example, the determination method of (1) is improved especially in terms of the ability to track an intentional line-of-sight movement by dynamically setting the threshold Tth in accordance with the type of a main subject and the type of the shooting scene.

The type of a main subject and the type of a shooting scene can be realized using luminance information and color information of shot image data, or using a known technique to search for an image pattern characteristic to the main subject. However, in the present embodiment, in order to make a distinction with high accuracy, the types of a main subject and a shooting scene are determined using, for example, a trained neural network (training model) stored in the memory unit 4.

<Determination of Types of Main Subject and Shooting Scene Using Neural Network>

In the present embodiment, the neural network is composed of the neocognitron, which is one type of a CNN (convolutional neural network). By using the CNN, a main subject type and a shooting scene type can be determined with high accuracy.

Figure 10:
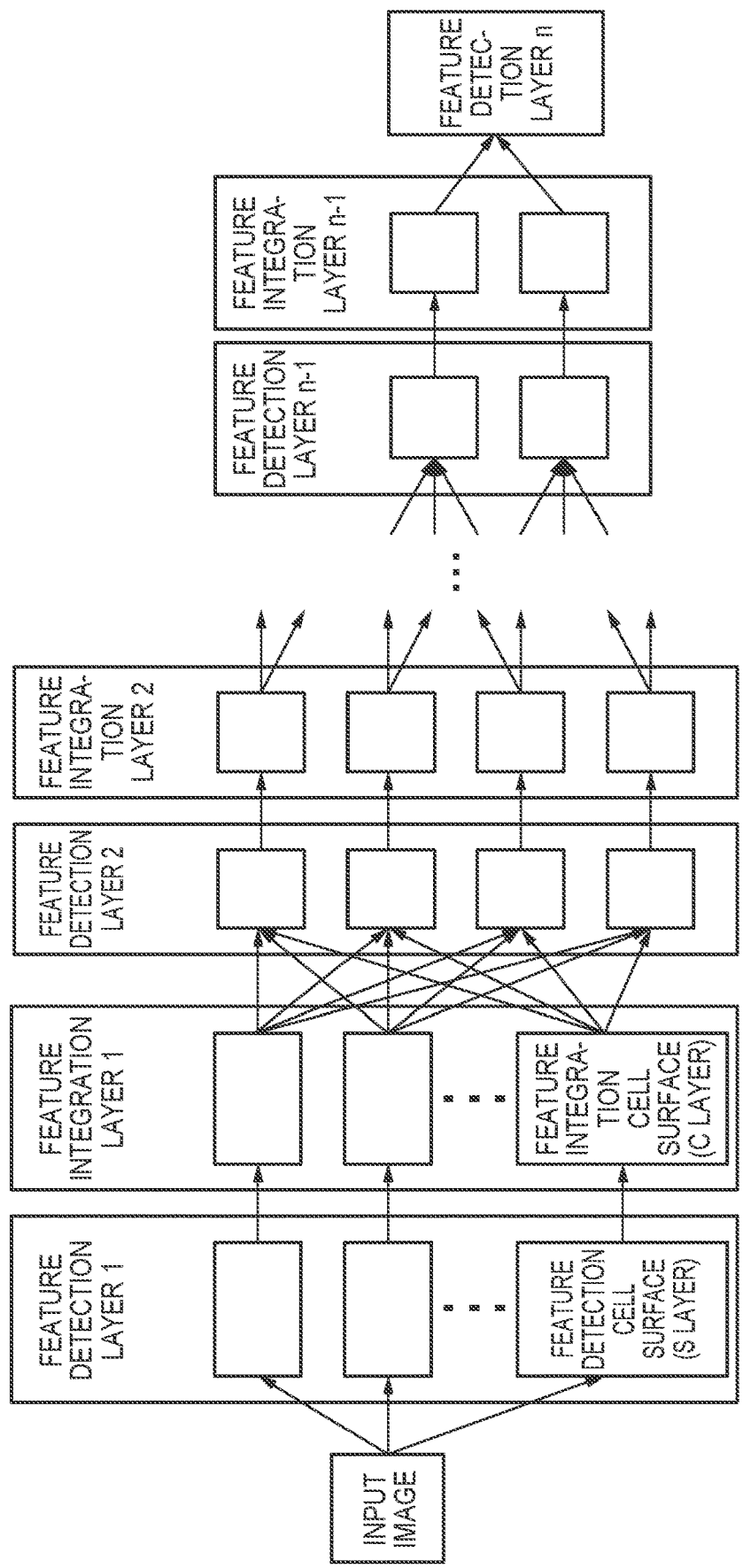
FIG. 10 is a schematic diagram showing an exemplary configuration of a CNN that is used in estimation of a point-of-gaze coordinates in an embodiment.

A basic configuration of the CNN that composes a determination device for a main subject type and a shooting scene type will be described using FIG. 10 and FIG. 11. FIG. 10 is a basic configuration of a CNN that determines the type of a main subject and the type of a shooting scene from input two-dimensional image data. In terms of the flow of processing, the left end represents an input, and processing proceeds in the rightward direction. In the CNN, two layers called a feature detection layer (S layer) and a feature integration layer (C layer) are used as one set, and these sets are hierarchically configured. Note that the S layer corresponds to a convolutional layer described as a conventional technique, and the C layer corresponds to a pooling layer or a sub-sampling layer also described thereas.

In the CNN, first, in the S layer, the next features are detected based on the features detected in an immediately preceding hierarchy level. Furthermore, the CNN has a configuration in which the features detected in the S layer are integrated in the C layer, and the integrated features are passed as a detection result in that hierarchy level to the next hierarchy level.

The S layer is composed of feature detection cell surfaces, and detects different features for different feature detection cell surfaces. Furthermore, the C layer is composed of feature integration cell surfaces, and performs pooling or sub-sampling with respect to the detection results from the feature detection cell surfaces in an immediately preceding hierarchy level. Hereinafter, the feature detection cell surfaces and the feature integration cell surfaces are collectively referred to as feature surfaces in a case where they need not be particularly distinguished from each other. In the present embodiment, an output layer that represents the last hierarchy level (the $n^{th}$ hierarchy level) is composed only of an S layer without using a C layer.

Figure 11:
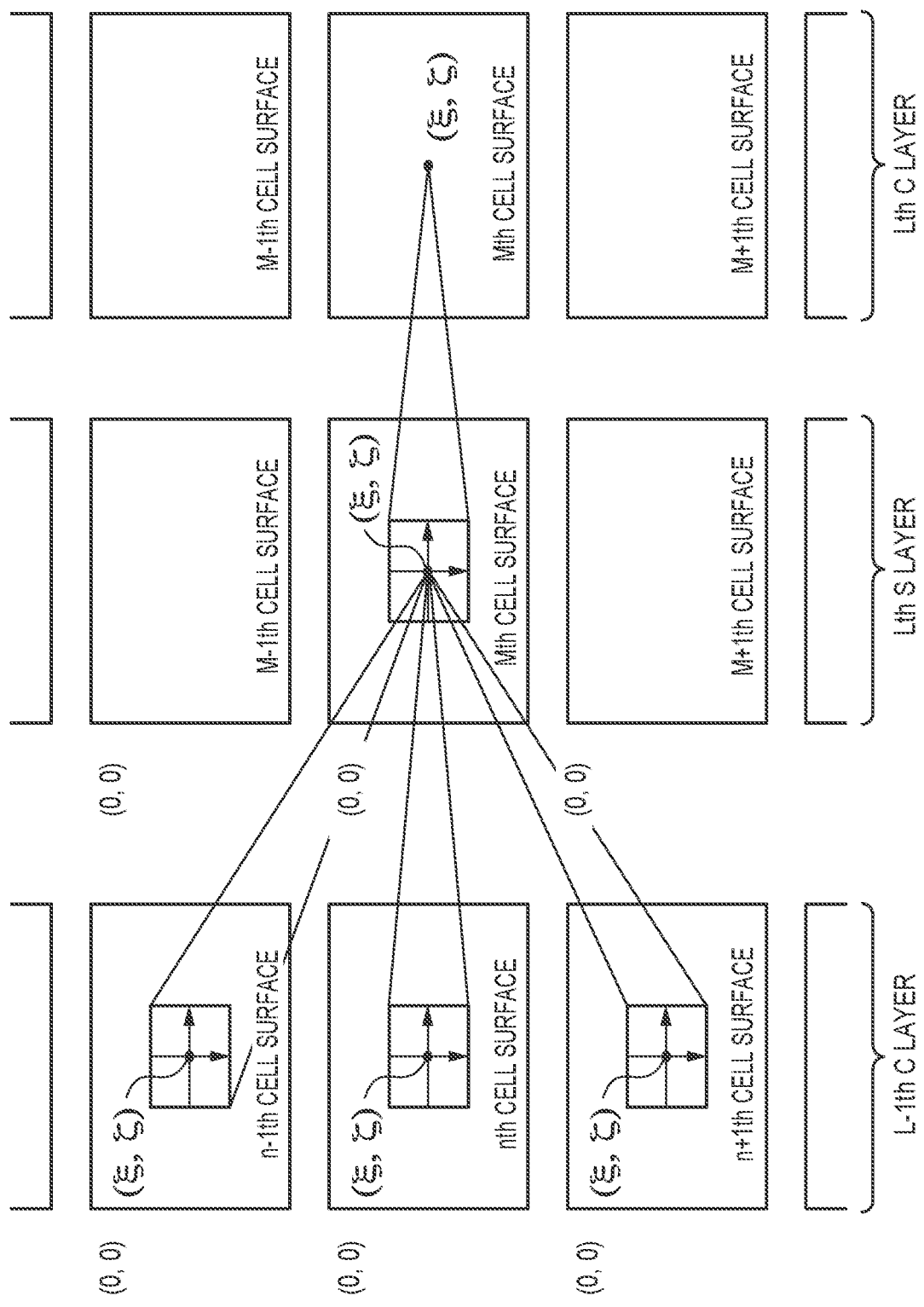
FIG. 11 is a schematic diagram showing a configuration of a part of the CNN of FIG. 10.

Using FIG. 11, a description is now given of the details of feature detection processing on the feature detection cell surfaces and feature integration processing on the feature integration cell surfaces. One feature detection cell surface is composed of a plurality of feature detection neurons, and the individual feature detection neurons are connected in the C layer of an immediately preceding hierarchy level under a predetermined structure. Furthermore, one feature integration cell surface is composed of a plurality of feature integration neurons, and the individual feature integration neurons are connected in the S layer of the same hierarchy level under a predetermined structure.

On the $M^{th}$ cell surface of the S layer in the $L^{th}$ hierarchy level shown in FIG. 11, an output value from the feature detection neuron at the position is denoted as follows.

$$y_M^{LS}(\xi,\zeta)$$

Furthermore, on the $M^{th}$ cell surface of the C layer in the $L^{th}$ hierarchy level, an output value from the feature integration neuron at the position is denoted as follows.

$$y_M^{LS}(\xi,\zeta)$$

In this case, provided that the connection coefficients of the respective neurons are $W_M^{LS}(n,u,v)$, $W_M^{LC}(u,v)$, each output value can be denoted as follows.

[Mathematical Formula 1]
$$y_M^{LS}(\xi,\zeta) \equiv f(u_M^{LS}(\xi,\zeta)) \equiv f\left\{\sum_{n,u,v} w_M^{LS}(n,u,v) \cdot y_n^{L-1C}(\xi+u,\zeta+v)\right\}$$

[Mathematical Formula 2]
$$y_M^{LC}(\xi,\zeta) \equiv u_M^{LC}(\xi,\zeta) \equiv \sum_{u,v} w_M^{LC}(u,v) \cdot y_M^{LS}(\xi+u,\zeta+v)$$

Here, f in mathematical formula 1 is an activating function, and is, for example, a sigmoid function such as a logistic function and a hyperbolic tangent function. The activating function can be realized by, for example, a tanh function. Furthermore, the following denotes an internal state of the feature detection neuron at the position $(\xi,\zeta)$ on the $M^{th}$ cell surface of the S layer in the $L^{th}$ hierarchy level.

$$U_M^{SL}(\xi,\zeta)$$

Mathematical formula 2 does not use the activating function, and is indicated using a simple linear sum.

In a case where the activating function is not used as in mathematical formula 2, an internal state of a neuron, $U_M^{LC}(\xi,\zeta)$, is equal to the following output value.

$$U_M^{LC}(\xi,\zeta)$$

Furthermore, $y_n^{L-1C}(\xi+u,\zeta+v)$ in mathematical formula 1 is referred to as an output value from a connection destination of a feature detection neuron, and $y_M^{LS}(\xi+u,\zeta+v)$ in mathematical formula 2 is referred to as an output value from a connection destination of a feature integration neuron.

A description is now given of $\xi$, $\zeta$, u, v, and n in mathematical formula 1 and mathematical formula 2. The position $(\xi\zeta)$ corresponds to coordinates in an input image; in a case where and an output value $Y_M^{LS}(\xi,\zeta)$ is large, it means that there is a high possibility that a feature detected by the $M^{th}$ cell surface of the S layer in the $L^{th}$ hierarchy level exists at the pixel position $(\xi\zeta)$ in the input image. Furthermore, in mathematical formula 1, n denotes the $n^{th}$ cell surface of the C layer in the $(L-1)^{th}$ hierarchy level, and is referred to as an integration destination feature number. Basically, a multiply-accumulate operation is performed with respect to every cell surface that exists in the C layer in the $(L-1)^{th}$ hierarchy level. (u,v) denotes coordinates of a relative position of a connection coefficient, and the multiply-accumulate operation is performed in a limited range (u,v) in accordance with the size of the feature to be detected. Such a limited range based on (u,v) is referred to as a receptive field. Furthermore, the size of the receptive field is hereinafter referred to as a receptive field size, and is denoted by the number of pixels in the horizontal direction x the number of pixels in the vertical direction in the connected ranges.

Furthermore, with regard to mathematical formula 1, in the S layer of L=1 or the first hierarchy level, $y_n^{L-1C}(\xi+u,\zeta+v)$ in mathematical formula 1 is the following input image.

$$y^{in\_iimage}(\xi+u,\zeta+v)$$

Note that as the distributions of neurons and pixels are discrete and connection destination feature numbers are also discrete, $\xi$, $\zeta$, u, v, and n take discrete values. It is assumed here that and are non-negative integers, n is a natural number, u and v are integers, and each of them has a limited range.

In mathematical formula 1, $W_M^{LS}(n,u,v)$ is a connection coefficient for detecting a predetermined feature, and adjusting the connection coefficient to an appropriate value enables detection of the predetermined feature. This adjustment of the connection coefficient is training; in constructing the CNN, the connection coefficient is adjusted by correcting the connection coefficient repeatedly and gradually using a variety of test patterns so that $y_M^{LS}(\xi,\zeta)$ represents an appropriate output value.

Next, in mathematical formula 2, $W_M^{LC}(u\ v)$ uses a two-dimensional Gaussian function, and can be denoted by the following mathematical formula 3.

[Mathematical Formula 3]
$$w_M^{LC}(u,v) = \frac{1}{2\pi\sigma_{L,M}^2} \cdot \exp\left(-\frac{u^2+v^2}{2\sigma_{L,M}^2}\right)$$

Here, (u,v) has a limited range again, and the range is referred to as a receptive field and the size of the range is referred to as a receptive field size, similarly to the case of feature detection neurons. Here, the value of the receptive field size can be set as appropriate in accordance with the size of the $M^{th}$ feature of the S layer in the $L^{th}$ hierarchy level. In mathematical formula 3, σ denotes a feature size factor, and may be a constant that can be set as appropriate in accordance with the receptive field size. For example, the feature size factor σ can be set so that an outermost value of the receptive field becomes a value can be substantially regarded as 0. As described above, the determination device according to the present embodiment is composed of a CNN which performs the above-described computation in each hierarchy level, and which determines the type of a main subject and the type of a shooting scene in the S layer of the last hierarchy level (the $n^{th}$ hierarchy level).

(Training Method for Subject Detection)

A description is now given of a specific adjustment (training) method for the following connection coefficient.

$$W_M^{LS}(n,u,v)$$

Training is to correct the following connection coefficient based on a relationship between an output value from a neuron, which is obtained by providing a specific input image (test pattern) to the CNN, and a supervisory signal (an output value to be output by that neuron).

$$W_M^{LS}(n,u,v)$$

In training of the present embodiment, with respect to the feature detection layer S in the last hierarchy level (the $n^{th}$ hierarchy level), the connection coefficient is corrected using the method of least squares. Furthermore, with respect to the feature detection layers S in other hierarchy levels (the first to the $(n-1)^{th}$ hierarchy levels), the connection coefficient is corrected using an error backpropagation method. As the correction method for the connection coefficient that uses the method of least squares and the error backpropagation method can use known techniques, a detailed description thereof is omitted.

For example, a CNN that classifies a main subject type and a CNN that classifies a shooting scene type are prepared separately, and they each perform supervised learning using image data for training. In this way, a training model that functions as a classifier for the main subject type and a classifier for the shooting scene type can be prepared.

The CPU 3 can obtain the results of determination of the main subject type and the shooting scene type by, for example, inputting captured image data to the training model stored in the memory unit 4. Furthermore, the appropriate thresholds Tth that are preset respectively for the main subject types and the shooting scene types to be determined can be stored in the memory unit 4. As described above, for a main subject with which the change in the direction and the speed of movement has a low degree of regularity or a shooting scene that includes such a main subject, the value of the threshold Tth is made smaller than that for a main subject with which the change in the direction and the speed of movement has regularity or a shooting scene that includes such a main subject. There may be three or more types of the threshold Tth in accordance with the types of the main subject (shooting scene).

The CPU 3 obtains the threshold Tth appropriate for a main subject or a shooting scene that is currently shot by referring to the memory unit 4 based on the determination result, and uses the threshold Tth in determining whether the movement of the point-of-gaze coordinates has been made intentionally.

Note that while the threshold Tth can be decided on, for example, each time a significant scene change has been detected through comparison between frames and the like, the decision may be made under other conditions. Whenever possible, the decision may be made on a per-frame basis. Furthermore, parameters other than the threshold Tth may also be set dynamically in accordance with the types of a main subject and a shooting scene.

According to the present modification example, the threshold used in determining whether the line-of-sight movement has been made intentionally is set in accordance with the types of a main subject and a shooting scene. This makes it possible to control whether to prioritize the ability to track a change in the main subject region in response to the line-of-sight movement, or prioritize stability of the main subject region, in consideration of the characteristics of the main subject and the shooting scene. As a result, a user-friendly line-of-sight detection function can be provided.

(Second Modification Example: Deciding on Threshold Tth Based on Motion of Camera)

Figure 12A:
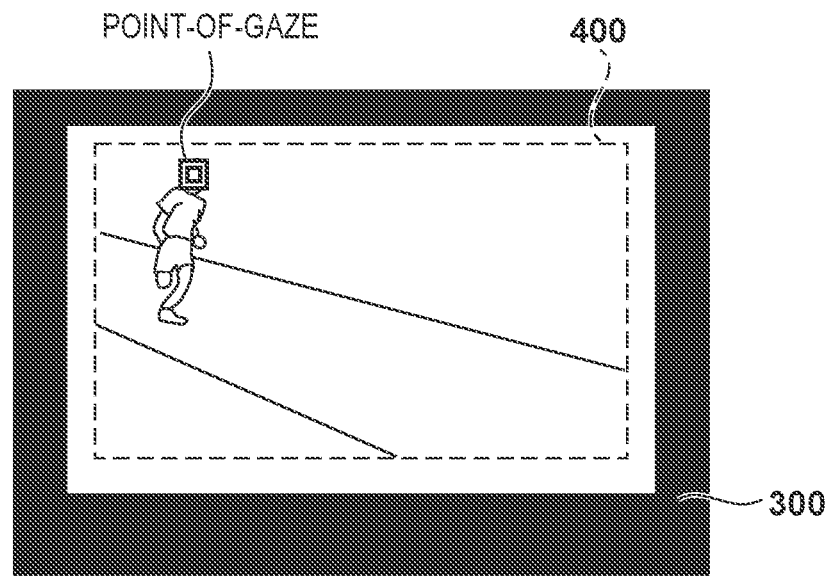
FIGS. 12A and 12B are schematic diagrams showing movements of a moving subject and a point-of-gaze within a viewfinder field during fixed shooting.
Figure 12B:
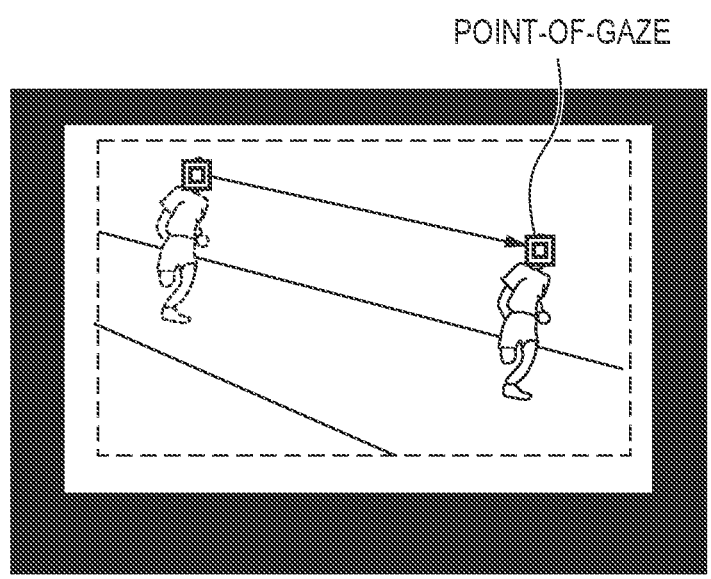

FIG. 12A and FIG. 12B are examples of a viewfinder image at the time of shooting of a track and field competition in a state where the shooting range of the camera 1 is fixed by way of attachment to a tripod and the like. A main subject moves from the left side toward the right side of the shooting range from a time point of FIG. 12A to a time point of FIG. 12A. As the shooting range is fixed, in a case where a moving subject is shot, the moving range of the main subject in the shooting range is large, and the moving speed thereof is also high especially in the case of telephoto shooting.

Figure 13A:
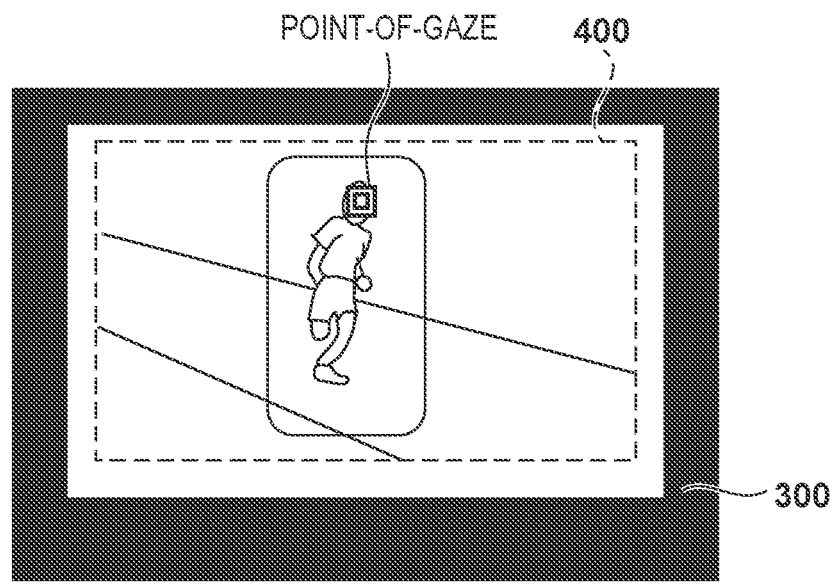
FIGS. 13A and 13B are schematic diagrams showing movements of a moving subject and a point-of-gaze within a viewfinder field during panning shooting.
Figure 13B:
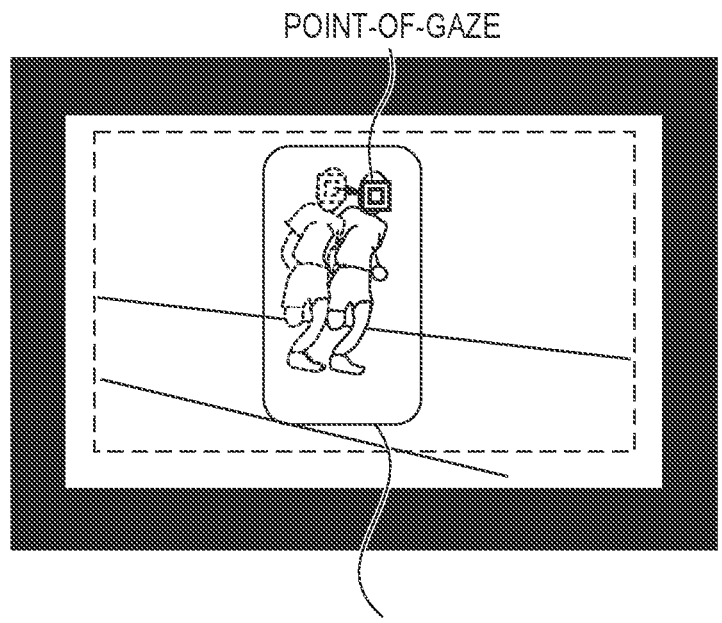

On the other hand, FIG. 13A and FIG. 13B show examples in which, with respect to the same shooting scene as FIG. 12A and FIG. 12B, shooting has been performed while changing the shooting range of the camera 1 so as to maintain the position of the main subject within the shooting range. This is equivalent to a case where panning shooting has been performed in a state where the camera 1 is hand-held or attached to a tripod. In this case, the moving range and the moving speed of the main subject in the shooting range decrease compared to the case of FIGS. 12A and 12B. Note that the angle of view is constant in FIG. 12A, FIG. 12B, FIG. 13A, and FIG. 13B.

In a case where both the moving range and the moving speed of the main subject within the shooting range are large as shown in FIG. 12A and FIG. 12B, it is required to quickly focus on the point-of-gaze coordinates that moves in coordination with the movement of the main subject. Therefore, the shorter the threshold Tth, the more appropriate. On the other hand, in a case where both the moving range and the moving speed of the main subject within the shooting range are small as shown in FIG. 13A and FIG. 13B, the movement of the point-of-gaze is also small. Therefore, it is more appropriate to set a longer threshold Tth so as to place more importance on stability than the ability to track the line-of-sight movement.

In the present modification example, the determination method of (1) is improved especially in terms of the ability to track an intentional line-of-sight movement by dynamically setting the threshold Tth in accordance with a motion of the camera 1 or the camera main body 1B.

The motion of the camera 1 or the camera main body 1B can be detected by the motion sensor 18 included in the camera main body 1B. Furthermore, conditions for determining the motion of the camera can be decided on and stored into the memory unit 4 in advance based on the outputs from the motion sensor 18 in a case where the camera is fixed and in a case the camera is panned. In addition, the appropriate thresholds Tth that are preset respectively for the types of the motion of the camera (fixed, panned, and so forth) can also be stored in the memory unit 4. As stated earlier, the threshold Tth has a smaller value in a case where the camera is fixed than in a case where the camera is panned. Note that a motion of the camera other than the fixed and panned states may be detected.

The CPU 3 can determine whether the camera is fixed or panned by applying the determination conditions stored in the memory unit 4 to an output from the motion sensor 18. Then, the CPU 3 obtains a threshold Tth appropriate for the current motion of the camera in accordance with the determination result, and uses the threshold Tth in determining whether the movement of the point-of-gaze coordinates has been made intentionally.

Note that the method of detecting the motion of the camera is not limited to the method that uses the motion sensor 18. For example, inter-frame motion information of moving images that are shot by the camera using the image sensor 2 can be detected, and motion information can be detected from the inter-frame differences at the position of the main subject region. The inter-frame differences at the position of the main subject region are synonymous with motion vectors of the main subject region, and can be detected using a known method.

Furthermore, the camera 1 may be configured to use a threshold Tth that is premised on panning shooting in a case where a shooting mode that is premised on panning shooting, such as a tracking shot mode, is set thereon.

Moreover, the smaller the angle of view is, the smaller the shooting range becomes, and thus the faster the moving speed of a moving subject within the shooting range becomes. For this reason, the threshold Tth may be set in consideration of the angle of view in addition to at least one of the main subject, the shooting scene, and the motion of the camera. Basically, the threshold Tth can be made smaller as the angle of view decreases.

In addition, in a case where the CPU 3 has detected that the camera has been mounted on an apparatus for fixing the camera, or that such settings have been configured, the threshold Tth may be decided on under the assumption that the camera does not move.

According to the present modification example, the threshold used in determining whether the line-of-sight movement has been made intentionally is set in consideration with a motion of the camera. This makes it possible to control whether to prioritize the ability to track a change in the main subject region in response to the line-of-sight movement, or prioritize stability of the main subject region, in consideration of the intention of the user. As a result, a user-friendly line-of-sight detection function can be provided.

Note that the first modification example and the second modification example may be embodied in combination. For example, a smaller one of the threshold Tth obtained in the first modification example and the threshold Tth obtained in the second modification example can be used, or an average value thereof can be used.

<Overall Operations of Camera 1>

Figure 14A:
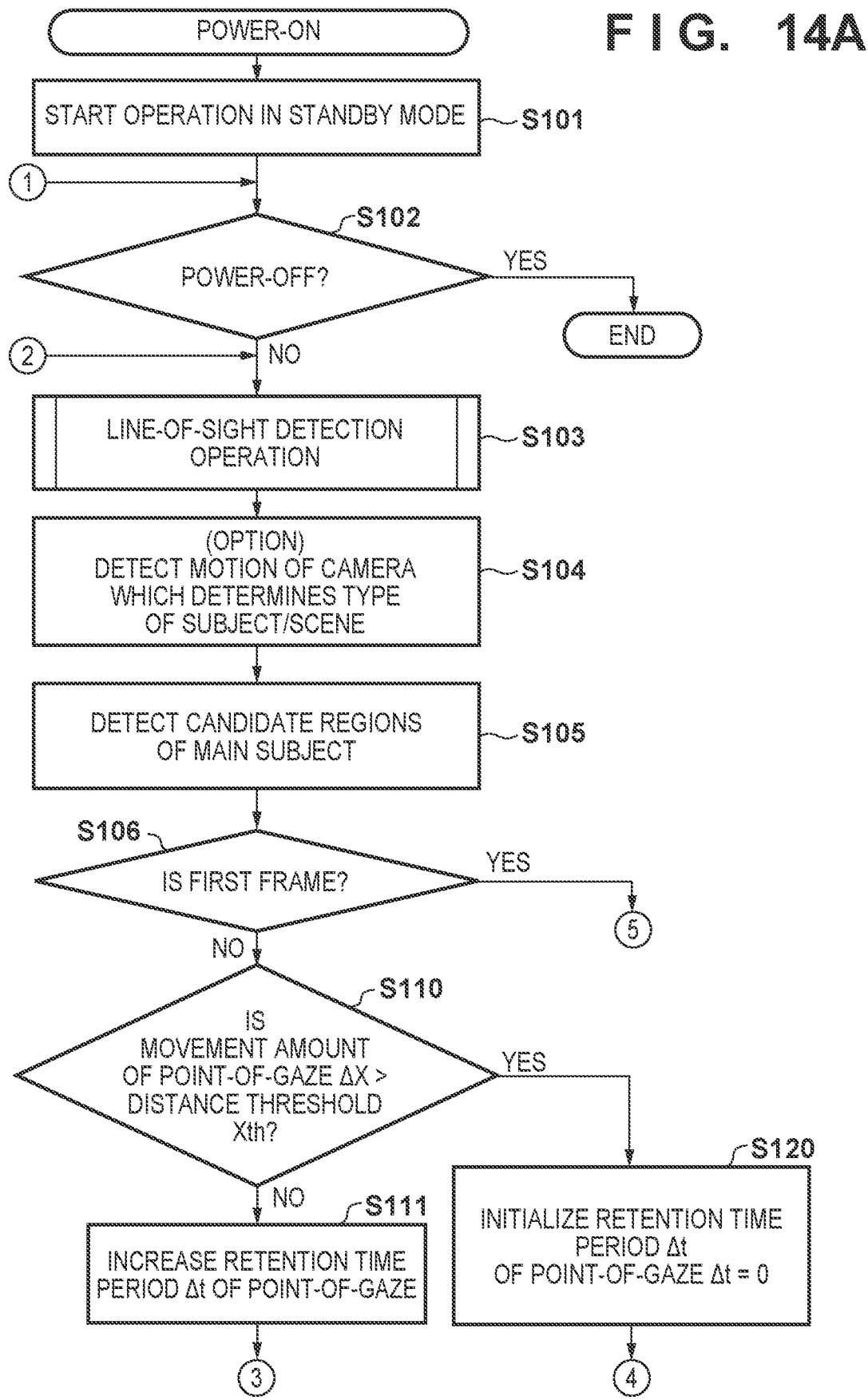
FIGS. 14A and 14B are flowcharts related to operations of the camera according to an embodiment.
Figure 14B:
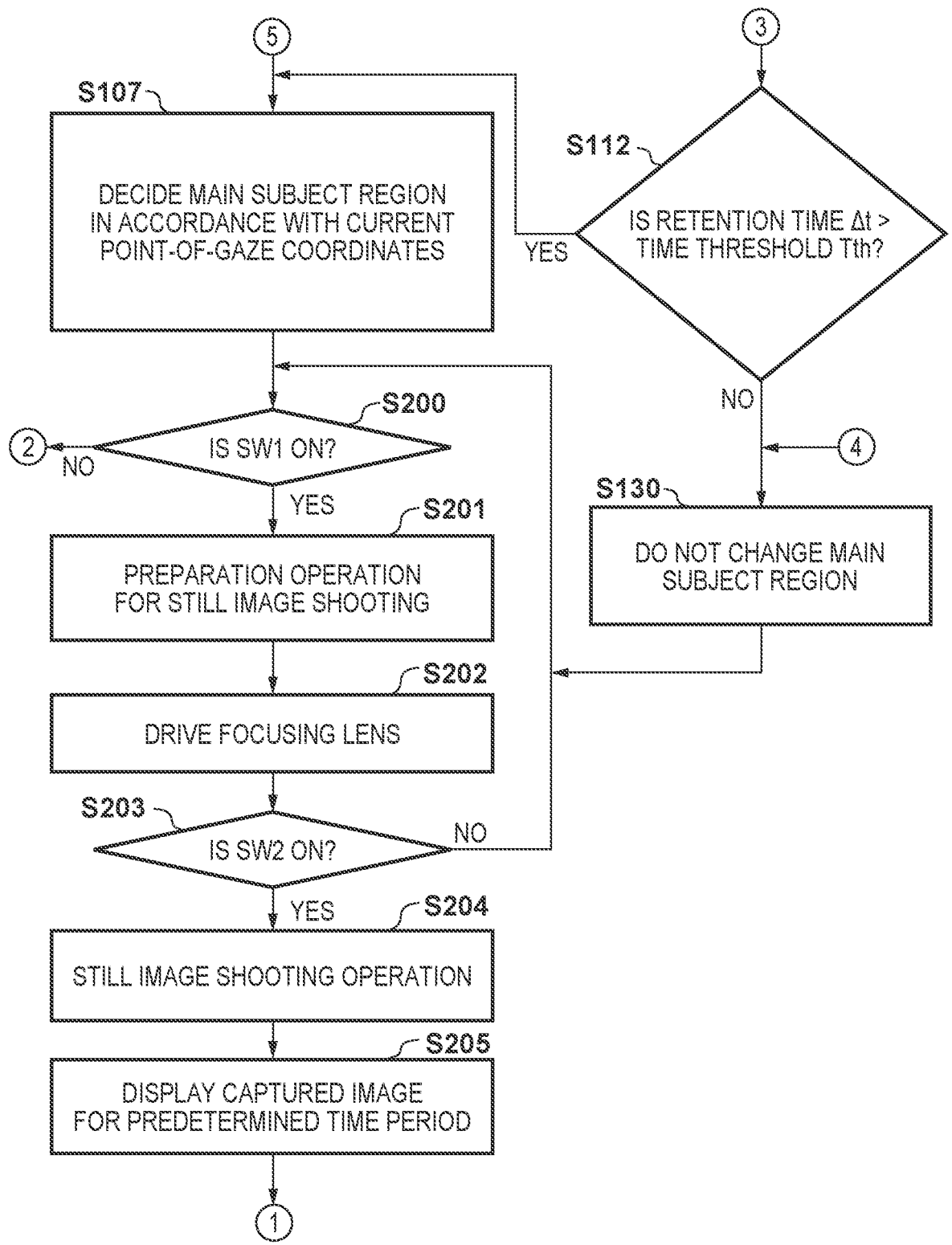

Overall operations of the camera 1 are now described using a flowchart of FIG. 14A and FIG. 14B. The operations indicated by the flowchart of FIG. 14A and FIG. 14B are started when an instruction for power-ON has been issued by operating the power switch of the operation unit 204.

In S101, the CPU 3 executes activation processing, and starts an operation in a standby mode. In the standby mode, the CPU 3 causes the display element 10 and the touch display 42 as EVFs while monitoring for operations performed on the operation unit 204. Specifically, the CPU 3 controls the image sensor 2 to perform shooting of moving images, generates live-view images, and displays them on the display element 10 and the touch display 42.

In S102, the CPU 3 determines whether an instruction for power-OFF has been issued by operating the power switch of the operation unit 204. When the CPU 3 determines that the instruction for power-OFF has been issued, it executes shutdown processing, and ends processing of FIG. 14A and FIG. 14B. On the other hand, when the CPU 3 does not determine that the instruction for power-OFF has not been issued, it executes S103.

In S103, the CPU 3 starts the line-of-sight detection operation that has been described using FIG. 5 to FIG. 7. The CPU 3 obtains the point-of-gaze coordinates (Hx, Hy) on the display element 10 (on a live-view image) through the line-of-sight detection operation.

S104 is a process that is executed when implementing the first and second modification examples, and is not indispensable. In S104, with respect to a frame image obtained from the image sensor 2, the CPU 3 determines the type of a main subject and/or the shooting scene as described in the first modification example, and/or detects a motion of the camera as described in the second modification example. Then, the CPU 3 decides on the values of parameters, such as a threshold Tth.

In S105, the CPU 3 detects candidate regions of the main subject by applying subject detection processing to the frame image obtained from the image sensor 2. For each candidate region, the CPU 3 stores the position, the size, the type of the main subject, and so forth into the memory unit 4 as the detection results.

In S106, the CPU 3 determines whether the frame image obtained from the image sensor 2 is the first frame; it executes S107 when the frame image is determined to be the first frame, and executes S110 when the frame image is not determined to be the first frame.

In S107, the CPU 3 decides on the candidate region including the current point-of-gaze coordinates as the main subject region based on information of the point-of-gaze coordinates detected in S103 and the candidate regions detected in S105.

In S110, the CPU 3 obtains the amount of change $\Delta X$ in the point-of-gaze coordinates between the previous frame and the current frame, and determines whether the amount of change $\Delta X$ is larger than the threshold Xth. As described earlier, this determination is the determination of whether a significant line-of-sight movement has occurred. In a case where it is not determined that the amount of change $\Delta X$ in the point-of-gaze coordinates is larger than the threshold Xth (in a case where the amount of change $\Delta X$ is equal to or smaller than the threshold Xth), the CPU 3 determines that a significant line-of-sight movement has not occurred, and executes S111. On the other hand, in a case where it is determined that the amount of change $\Delta X$ in the point-of-gaze coordinates is larger than the threshold Xth, the CPU 3 determines that a significant viewpoint movement has occurred, and executes S120.

The CPU 3 increases the retention time period $\Delta t$ of the current point-of-gaze coordinates by a predetermined time period in S111, and executes S112. S111 is equivalent to an operation of measuring the retention time period Δt.

In S112, the CPU 3 determines whether the retention time period Δt is longer than the threshold Tth. This is the determination of whether the current gazing is intentional, or is merely the result of reflexive shifting of the line of sight. In a case it is not determined that the retention time period Δt is longer than the threshold Tth (the retention time period Δt is equal to or shorter than the threshold Tth), the CPU 3 executes S130. Meanwhile, in a case it is determined that the retention time period Δt is longer than the threshold Tth, the CPU 3 executes S107. As a result, the candidate region corresponding to the current point-of-gaze coordinates is decided on as a new main subject region.

In S120, as a result of determining that there has been a significant change in the point-of-gaze coordinates in S110, the CPU 3 initializes the retention time period Δt to 0, and executes S130.

The CPU 3 does not change the main subject region in the current frame from the main subject region in the previous frame in S130, and executes S200. Even in a case where there has been a significant movement of the point-of-gaze coordinates, if the retention time period at the point-of-gaze after the movement is short, then the line-of-sight movement is deemed reflexive, and the main subject region is not changed.

In S200, the CPU 3 determines whether SW1 has been turned ON by an operation of pressing the release button 5 of the operation unit 204 halfway. The CPU 3 executes S201 when it is determined that SW1 has been turned ON, and executes S103 again when it is not determined that SW1 has been turned ON.

In S201, the CPU 3 executes a preparation operation for still image shooting. The preparation operation includes focus detection processing for the current AF frame, exposure control processing for achieving appropriate exposure inside the AF frame, and so forth. Note that in the focus detection, a phase-difference detection method may be used, or a contrast detection method may be used. Upon completion of the preparation operation, the CPU 3 executes S202.

In S202, the CPU 3 drives the movable lens 1a inside the lens unit 1A based on the result of the focus detection processing in S201, then executes S203.

In S203, the CPU 3 determines whether SW2 has been turned ON by an operation of fully pressing the release button 5 of the operation unit 204. The CPU 3 executes S204 when it is determined that SW2 has been turned ON, and executes S200 again when it is not determined that SW2 has been turned ON.

In S204, the CPU 3 executes still image shooting in accordance with the exposure conditions that were decided on in exposure control processing of S201. The CPU 3 generates still image data by applying known image processing to still image data that has been read out from the image sensor 2. The CPU 3 stores the still image data into the memory unit 4, and executes S205.

In S205, the CPU 3 generates image data for display based on the still image data, displays the image data for display on the display element 10 and the touch display 42 for a certain time period, and then returns to the operation in the standby mode, thereby repeatedly executing S102 onward.

As described above, according to the present embodiment, in a case where a line-of-sight movement has been detected on an image capturing apparatus that has a line-of-sight detection function, it is determined that the line-of-sight movement is not intended by the user if the line of sight is not retained at the point-of-gaze after the movement for a certain time period or longer. This can suppress the execution of an operation that is not intended by the user on the image capturing apparatus due to a line-of-sight movement that is not intended by the user, such as a reflexive line-of-sight movement.

Furthermore, the time threshold for determining whether the line-of-sight movement has been made intentionally can be set in accordance with the types of a main subject and a shooting scene, or can be set in accordance with a motion of the image capturing apparatus. In this case, both of the stability of operations of the image capturing apparatus in relation to an unintended line-of-sight movement, and the ability of operations of the image capturing apparatus to track an intended line-of-sight movement, can be realized.

The present invention can provide an electronic device that has a line-of-sight detection function and is capable of suppressing the execution of an operation different from the intention of a user, and a control method therefor.

Other Embodiments

The above embodiment has been described in relation to a configuration in which the line-of-sight detection function is used in operations associated with image capture, such as in deciding on a main subject region, and in deciding on an AF frame. However, the invention of the present application can also be similarly embodied on other devices, such as an electronic device that uses a line of sight in operating a GUI. For example, the execution of an unintended operation caused by a reflexive line-of-sight movement can be suppressed by applying the present invention to an electronic device that recognizes an operation performed on a GUI component (e.g., a software key, button, switch, menu, or slider) that includes the point-of-gaze coordinates.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device, comprising:
one or more processors that execute a program stored in a memory and thereby function as:
a detection unit configured to detect coordinates on an image at which a user is gazing as point-of-gaze coordinates;
a measurement unit configured to, in a case where a movement of the point-of-gaze coordinates has been detected, measure a duration of the point-of-gaze coordinates after the movement; and
a determination unit configured to determine that the movement of the point-of-gaze coordinates with the duration larger than a time threshold is a viewpoint movement that is intended by the user, and determine that the movement of the point-of-gaze coordinates with the duration equal to or smaller than the time threshold is a viewpoint movement that is not intended by the user,
wherein the measurement unit measures the duration with regard to a movement of the point-of-gaze coordinates with an amount of movement that exceeds a distance threshold, and
wherein the time threshold is dynamically set based on a motion of the electronic device.

2. The electronic device according to claim 1, wherein with regard to the movement of the point-of-gaze coordinates that has been determined by the determination unit to be the viewpoint movement that is intended by the user, an operation based on the point-of-gaze coordinates after the movement is executed.

3. The electronic device according to claim 2, wherein the image is a live-view image, and
the operation is an operation of deciding on a feature region including the point-of-gaze coordinates after the movement as a main subject region.

4. The electronic device according to claim 2, wherein the image is a live-view image, and
the operation is focus detection processing for an AF frame that includes the point-of-gaze coordinates after the movement.

5. The electronic device according to claim 1, wherein with regard to the movement of the point-of-gaze coordinates that has been determined by the determination unit to be the viewpoint movement that is not intended by the user, an operation based on the point-of-gaze coordinates after the movement is not executed.

6. The electronic device according to claim 1, wherein the electronic device is an image capturing apparatus.

7. The electronic device according to claim 1 wherein the time threshold of a case where the electronic device is not in operation is smaller than the time threshold of a case where the electronic device is in operation.

8. An image capturing apparatus, comprising:
one or more processors that execute a program stored in a memory and thereby function as:
a detection unit configured to detect coordinates on a live-view image at which a user is gazing as point-of-gaze coordinates;
a measurement unit configured to, in a case where a movement of the point-of-gaze coordinates has been detected, measure a duration of the point-of-gaze coordinates after the movement; and
a determination unit configured to
upon detection of the movement of the point-of-gaze coordinates with the duration larger than a time threshold, use a feature region that includes the point-of-gaze coordinates after the movement as a new main subject region, and
upon detection of the movement of the point-of-gaze coordinates with the duration equal to or smaller than the time threshold, maintain a main subject region before the movement of the point-of-gaze coordinates,
wherein the measurement unit measures the duration with regard to a movement of the point-of-gaze coordinates with an amount of movement that exceeds a distance threshold, and
wherein the time threshold is dynamically set based on a motion of the electronic device.

9. A control method for an electronic device executed by the electronic device, comprising:
detecting coordinates on an image at which a user is gazing as point-of-gaze coordinates;
in a case where a movement of the point-of-gaze coordinates has been detected, measuring a duration of the point-of-gaze coordinates after the movement; and
determining that the movement of the point-of-gaze coordinates with the duration larger than a time threshold is a viewpoint movement that is intended by the user; and
determining that the movement of the point-of-gaze coordinates with the duration equal to or smaller than the time threshold is a viewpoint movement that is not intended by the user,
wherein the measuring measures the duration with regard to a movement of the point-of-gaze coordinates with an amount of movement that exceeds a distance threshold, and
wherein the time threshold is dynamically set based on a motion of the electronic device.

10. A non-transitory computer-readable medium storing a program that causes, when executed by a computer included in an electronic device that has a function of detecting coordinates on an image at which a user is gazing as point-of-gaze coordinates, the computer to function as:
a detection unit configured to detect coordinates on an image at which a user is gazing as point-of-gaze coordinates;
a measurement unit configured to, in a case where a movement of the point-of-gaze coordinates has been detected, measure a duration of the point-of-gaze coordinates after the movement; and
a determination unit configured to determine that the movement of the point-of-gaze coordinates with the duration larger than a time threshold is a viewpoint movement that is intended by the user, and determine that the movement of the point-of-gaze coordinates with the duration equal to or smaller than the time threshold is a viewpoint movement that is not intended by the user,
wherein the measurement unit measures the duration with regard to a movement of the point-of-gaze coordinates with an amount of movement that exceeds a distance threshold, and
wherein the time threshold is dynamically set based on a motion of the electronic device.

* * * * *